United States Patent
Ha et al.

(10) Patent No.: US 11,272,552 B2
(45) Date of Patent: Mar. 8, 2022

(54) NETWORK CONNECTION METHOD AND APPARATUS

(71) Applicant: Samsung Electronics Co., Ltd., Suwon-si (KR)

(72) Inventors: Jihun Ha, Suwon-si (KR); Soohyun Baek, Suwon-si (KR); Sangjin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/422,400

(22) Filed: May 24, 2019

(65) Prior Publication Data

US 2020/0205205 A1 Jun. 25, 2020

(30) Foreign Application Priority Data

Dec. 20, 2018 (KR) .................. 10-2018-0166606

(51) Int. Cl.
*H04W 76/10* (2018.01)
*H04W 48/16* (2009.01)
*H04W 4/80* (2018.01)

(52) U.S. Cl.
CPC ............ *H04W 76/10* (2018.02); *H04W 4/80* (2018.02); *H04W 48/16* (2013.01)

(58) Field of Classification Search
CPC ........ H04W 48/16; H04W 4/80; H04W 76/10
See application file for complete search history.

(56) References Cited

U.S. PATENT DOCUMENTS

| 10,219,193 | B2 | 2/2019 | Kim et al. | |
|---|---|---|---|---|
| 2006/0138224 | A1* | 6/2006 | Azami | H04W 4/021 235/385 |
| 2015/0042449 | A1* | 2/2015 | Suh | H04W 12/08 340/5.7 |
| 2015/0339334 | A1 | 11/2015 | Hanke | |
| 2017/0303259 | A1 | 10/2017 | Lee et al. | |
| 2018/0121936 | A1 | 5/2018 | Madduri et al. | |
| 2018/0192445 | A1 | 7/2018 | Jiang | |
| 2018/0332523 | A1 | 11/2018 | Faccin et al. | |
| 2019/0021047 | A1 | 1/2019 | Zong | |
| 2019/0037409 | A1* | 1/2019 | Wang | H04W 16/04 |

FOREIGN PATENT DOCUMENTS

| CN | 106375987 A | 2/2017 |
|---|---|---|
| EP | 3 327 992 A1 | 5/2018 |
| KR | 10-2018-0021650 A | 3/2018 |

OTHER PUBLICATIONS

International Search Report dated Sep. 20, 2019, issued in an International application No. PCT/KR2019/006368.

* cited by examiner

*Primary Examiner* — Mansour Oveissi
(74) *Attorney, Agent, or Firm* — Jefferson IP Law, LLP

(57) ABSTRACT

A network connection method and apparatus are provided. The network connection method includes obtaining information about at least one network to be accessed by the terminal, obtaining information about a network slice allowed for the terminal from among network slices included in the at least one network, and based on a network corresponding to the information about the at least one network being detected, accessing the allowed network slice of the detected network based on the information about the allowed network slice.

14 Claims, 16 Drawing Sheets

FIG. 13

| SST | SST value | SD(optional) |
|---|---|---|
| eMBB | 1 | N/A |
| URLLC | 2 | N/A |
| MIoT | 3 | N/A |
| Factory | 4 | Control |
| Factory | 4 | Monitoring |
| Factory | 4 | Management |
| Factory | 4 | Urgent |

NETWORK CONNECTION METHOD AND APPARATUS

CROSS-REFERENCE TO RELATED APPLICATION(S)

This application is based on and claims priority under 35 U.S.C. § 119(a) of a Korean patent application number 10-2018-0166606, filed on Dec. 20, 2018, in the Korean Intellectual Property Office, the disclosure of which is incorporated by reference herein in its entirety.

BACKGROUND

1. Field

The disclosure relates to a network connection method and apparatus.

2. Description of Related Art

The Internet is evolving from a human-centered connection network through which humans create and consume information to an internet of things (IoT) network through which distributed elements, such as objects, exchange and process information. Internet of everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as a sensor network, machine to machine (M2M) communication, or machine type communication (MTC), has recently been studied. In an IoT environment, intelligent internet technology (IT) services that collect and analyze data generated by connected objects and create new value in human life may be provided. The IoT may be applied to fields such as a smart home, a smart building, a smart city, a smart car or a connected car, a smart grid, health care, a smart home appliance, and an advanced medical service through convergence and integration of existing information technology (IT) and various industries.

Various attempts are made to apply $5^{th}$ generation (5G) communication systems to IoT networks. For example, 5G communication technology such as a sensor network, M2M communication, or MTC is implemented by beam-forming, multiple-input and multiple-output (MIMO), array antenna, or the like. The application of a cloud radio access network (RAN) as big data processing technology may also be considered as an example of convergence of 5G technology and IoT technology.

Because wireless communication systems may provide various services due to the development of the above wireless communication systems, methods of effectively providing the services are required. Also, methods of effectively performing network connections between a terminal and a base station are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide are a network connection method and apparatus.

Additional aspects will be set forth in part in the description which follows and, in part, will be apparent from the description, or may be learned by practice of the presented embodiments of the disclosure.

In accordance with an aspect of the disclosure, a network connection method of a terminal is provided. The network connection method includes obtaining information about at least one network to be accessed by the terminal, obtaining information about a network slice allowed for the terminal from among network slices included in the at least one network, and based a network corresponding to the information about the at least one network being detected, accessing the allowed network slice of the detected network based on the information about the allowed network slice.

In accordance with another aspect of the disclosure, a network connection method of a base station is provided. The network connection method includes broadcasting network information, receiving identification information of a terminal and an entrance indicator from a gate device, based on a network access request being received from the terminal, determining whether identification information of a terminal included in the network access request and the identification information of the terminal received from the gate device are identical to each other, and based on the identification information of the terminal included in the network access request and the identification information of the terminal received from the gate device being identical to each other, performing a network access procedure of the terminal.

In accordance with another aspect of the disclosure, a terminal for performing a network connection is provided. The terminal includes a transceiver, at least one memory storing a program for the network connection, and at least one processor coupled to the at least one memory and configured to obtain information about at least one network to be accessed by the terminal, obtain information about a network slice allowed for the terminal from among network slices included in the at least one network, and based on a network corresponding to the information about the at least one network being detected, access the allowed network slice of the detected network based on the information about the allowed network slice.

In accordance with another aspect of the disclosure, a base station for performing a network connection is provided. The base station includes a transceiver, at least one memory storing a program for the network connection, and at least one processor coupled to the at least one memory and configured to broadcast network information, receive identification information of a terminal and an entrance indicator from a gate device, and based on a network access request being received from the terminal, determine whether identification information of a terminal included in the network access request and the identification information of the terminal received from the gate device are identical to each other, and based on the identification information of the terminal included in the network access request and the identification information of the terminal received from the gate device are identical to each other, perform a network access procedure of the terminal.

According to another embodiment of the disclosure, a computer program product includes a recording medium having embodied thereon a program for allowing a terminal to perform a network connection operation.

According to another embodiment of the disclosure, a computer program product includes a recording medium having embodied thereon a program for allowing a base station to perform a network connection operation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 is a view illustrating information about a network slice according to an embodiment of the disclosure;

Throughout the drawings, it should be noted that like reference numbers are used to depict the same or similar elements, features, and structures.

DETAILED DESCRIPTION

Figure 1:
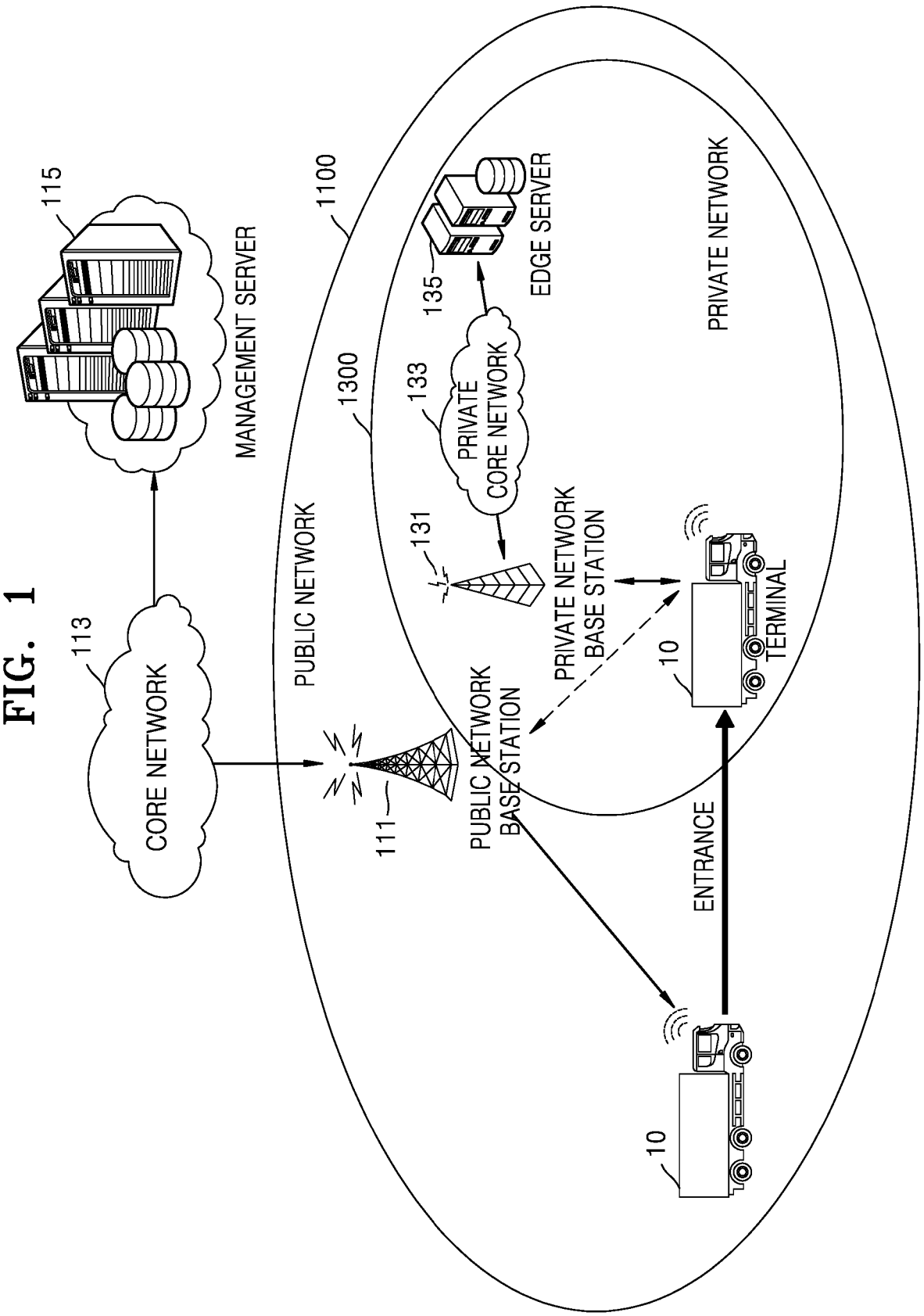
FIG. 1 is a view of a mobile communication system to which an embodiment of the disclosure is applied.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The disclosure may be described in terms of functional block components and various processing steps. Such functional blocks may be realized by any number of hardware and/or software components configured to perform the specified functions. For example, the functional blocks of the disclosure may be realized by one or more microprocessors or circuit components for a predetermined function. Furthermore, for example, the functional blocks of the disclosure may be implemented with various programming or scripting language. The functional blocks may be implemented in algorithms that are executed on one or more processors. Furthermore, the disclosure could employ any number of techniques according to the related art for electronics configuration, signal processing, data processing, and the like.

Furthermore, connecting lines, or connectors shown in various figures are intended to represent functional relationships and/or physical or logical couplings between various elements. It should be noted that many alternative or additional functional relationships, physical connections, or logical connections may be present in a practical device.

Terms such as " . . . unit" or " . . . module" refer to units that perform at least one function or operation, and the units may be implemented as hardware or software or as a combination of hardware and software. " . . . unit" or " . . . module" may be stored in an addressable storage medium as a program executable on a processor.

For example, " . . . unit" or " . . . module" may include any one or more of constituent elements such as software constituent elements, object-oriented software constituent elements, class constituent elements, and task constituent elements, processes, functions, attributes, procedures, subroutines, segments of program codes, drivers, firmware, microcodes, circuits, data, a database, data structures, tables, arrays, and variables.

Throughout the disclosure, the expression "at least one of a, b or c" indicates only a, only b, only c, both a and b, both a and c, both b and c, all of a, b, and c, or variations thereof.

Hereinafter, terms for identifying an access node, terms for indicating network entities, terms for indicating messages, terms for indicating an interface between network entities, and terms for indicating various pieces of identification information, as used in the following description, are exemplified for convenience of explanation. Accordingly, the disclosure is not limited to the terms to be described later, but other terms for indicating subjects having equal technical meanings may be used.

Hereinafter, for convenience of explanation, terms and names that are defined in the specification for $5^{th}$ generation (5G) or new radio (NR), and long term evolution (LTE)

systems are used in the disclosure. However, the disclosure is not limited to the terms and names, but may be equally applied to systems following other standards.

In describing embodiments of the disclosure, a communication standard defined by the $3^{rd}$ generation partnership project (3GPP) standard will be mainly described. However, the disclosure may be applied to other communication systems having similar technical backgrounds with small variations without departing from the scope of the disclosure, which may be determined by one skilled in the art to which the disclosure pertains.

FIG. 1 is a view of a mobile communication system to which an embodiment of the disclosure is applied.

Referring to FIG. 1, a mobile communication system to which an embodiment of the disclosure is applied may include a public network 1100 and a private network 1300. The public network 1100 may include a public network base station 111 and a core network 113, and the private network 1300 may include a private network base station 131 and a private core network 133. In an embodiment of the disclosure, the mobile communication system may include an NR or 5G communication system, and the public network base station 111 and the private network base station 131 may include a 5G base station (e.g., an NR node B, an NR gNB, or an NR base station), and the core network 113 and the private core network 133 may include a 5G core network (e.g., an NR core network) 120.

A terminal 10 refers to an electronic device that supports access to a network. The network may include an NR or 5G mobile communication system. In an embodiment of the disclosure, examples of the terminal 10 may include a smartphone, a tablet, a personal computer (PC), a notebook, a home appliance, a medical device, a camera, and a wearable device, and may also include any object that allows an electronic device to be mounted thereon and is capable of accessing the network. For example, the terminal 10 may include a vehicle that allows an electronic device to be mounted thereon and is capable of accessing the network, for example, an automobile, a truck, or a van. In an embodiment of the disclosure, the terminal 10 may include a user terminal (e.g., a user equipment (UE)). Also, the terminal 10 may access both the public network 1100 and the private network 1300, and may simultaneously access the public network 1100 and the private network 1300, or may access only one of the public network 1100 and the private network 1300. In this case, an access change or handover may occur from the public network 1100 to the private network 1300 or from the private network 1300 to the public network 1100.

The public network 1100 which anyone may access is a general mobile communication system. The public network 1100 may include the public network base station 111 and the core network 113. As described above, the mobile communication system of the public network 1100 may include an NR or 5G communication system, and the public network base station 111 may include a 5G base station and the core network 113 may include a 5G core network. The 5G base station is connected to the terminal 10 through a wireless channel and performs scheduling. The 5G base station may control a plurality of cells in general, and may use orthogonal frequency division multiplexing (OFDM) as radio access technology (RAT) and may use beamforming technology. Also, the 5G base station may perform adaptive modulation and coding (AMC) that determines a channel coding rate and a modulation scheme in accordance with a channel state of the terminal 10. The 5G core network may perform various control functions as well as a mobility management function on the terminal 10 and may be connected to a number of base stations. Also, the 5G core network may include functions such as an access and mobility function (AMF) and a session management function (SMF) and may perform functions such as mobility support, bearer configuration, and quality of service (QoS) configuration. Furthermore, the 5G core network may support access to another RAT. Although the mobile communication system of the public network 1100 is an NR or 5G communication system in the above, the mobile communication system of the public network 1100 may include a mobile communication system such as a $3^{rd}$ generation (3G) communication system, a $4^{th}$ generation (4G) communication system, an LTE communication system, or an LTE-advanced (LTE-A) communication system.

The private network 1300 is a network which only an authorized user may access. The private network 1300 may be used in, for example, a factory, a military base, or a company. However, the disclosure is not limited thereto, and the private network 1300 may be used in various ways when network security is required. The private network 1300 may include the private network base station 131 and the private core network 133. As described above, the mobile communication system of the private network 1300 may include an NR or 5G communication system, and the public network base station 111 may include a 5G base station and the core network 113 may include the 5G core network. The 5G base station is connected to the terminal 10 through a wireless channel and performs scheduling. The 5G base station may control a plurality of cells in general, and may use OFDM as RAT and may use beamforming technology. Also, the 5G base station may perform AMC that determines a channel coding rate and a modulation scheme in accordance with a channel state of the terminal 10. The 5G core network may perform various control functions as well as a mobility management function on the terminal 10 and may be connected to a number of base stations. Also, the 5G core network may include functions such as an AMF and an SMF and may perform functions such as mobility support, bearer configuration, and QoS configuration. Furthermore, the 5G core network may support access to another RAT.

In an embodiment of the disclosure, the private network 1300 may support network slicing. A general mobile communication system is designed independently from an application provided on the general mobile communication system. That is, a user may access the general mobile communication system, and then may select an application to be used and may receive a service. Such communication technology has been combined with technology such as network function virtualization (NFV) or software defined networking (SDN) to partition one big network into network slices each optimized for application characteristics of each application, which may be referred to as network slicing. One network slice may be composed of an end-to-end (E2E) logical network including a correspondent node (e.g., a correspondent terminal or a correspondent application server) from the terminal 10.

In an embodiment of the disclosure, the private network 1300 may allocate a network resource suitable for a service according to each slice or each specific slice set. The network resource may refer to a logical resource or radio a resource allocated to or provided by a network function (NF). The network slices may be provided together, or specific network slices may be mutually exclusively provided.

The private network 1300 may provide a network slice specialized for an application used by the user of the terminal 10, by using network slicing. In this case, the private network 1300 may simultaneously provide one or more network slices to the terminal 10 as needed.

A management server 115 that is a server for generally managing the private network 1300 may be connected to the public network 1100. For example, the management server 115 may allow the terminal 10 to access the private network 1300 or may block the terminal 10 from accessing the private network 1300. Also, although the management server 115 is connected to the public network 1100 in FIG. 1, the disclosure is not limited thereto, and may be connected to an entity of the private network 1300, for example, the private network base station 131 or the private core network 133.

An edge server 135 that is located in the private network 1300 may reduce latency by deploying various services and caching contents close to the terminal 10, may reduce the congestion of a core network of the mobile communication system, for example, the core network 113, through efficient network operations, and may provide a local service around the terminal 10. In this case, the edge server 135 may be implemented by using distributed cloud computing.

The edge server 135 may provide computing resources and storage resources, and may provide various services to the terminal 10 by executing various applications. In an embodiment of the disclosure, the edge server 135 may be located in the private network 1300, instead of the public network 1100, and may provide various services to the terminal 10 located within a range of the private network 1300. The edge server 135 may provide various services such as food ordering, ticketing, player cam, video caching, video caching, data caching, V2X service, augmented reality (AR), virtual reality (VR), and games, and may provide proximity, situation awareness, agility, a fast response time, and a high processing speed.

Figure 2:
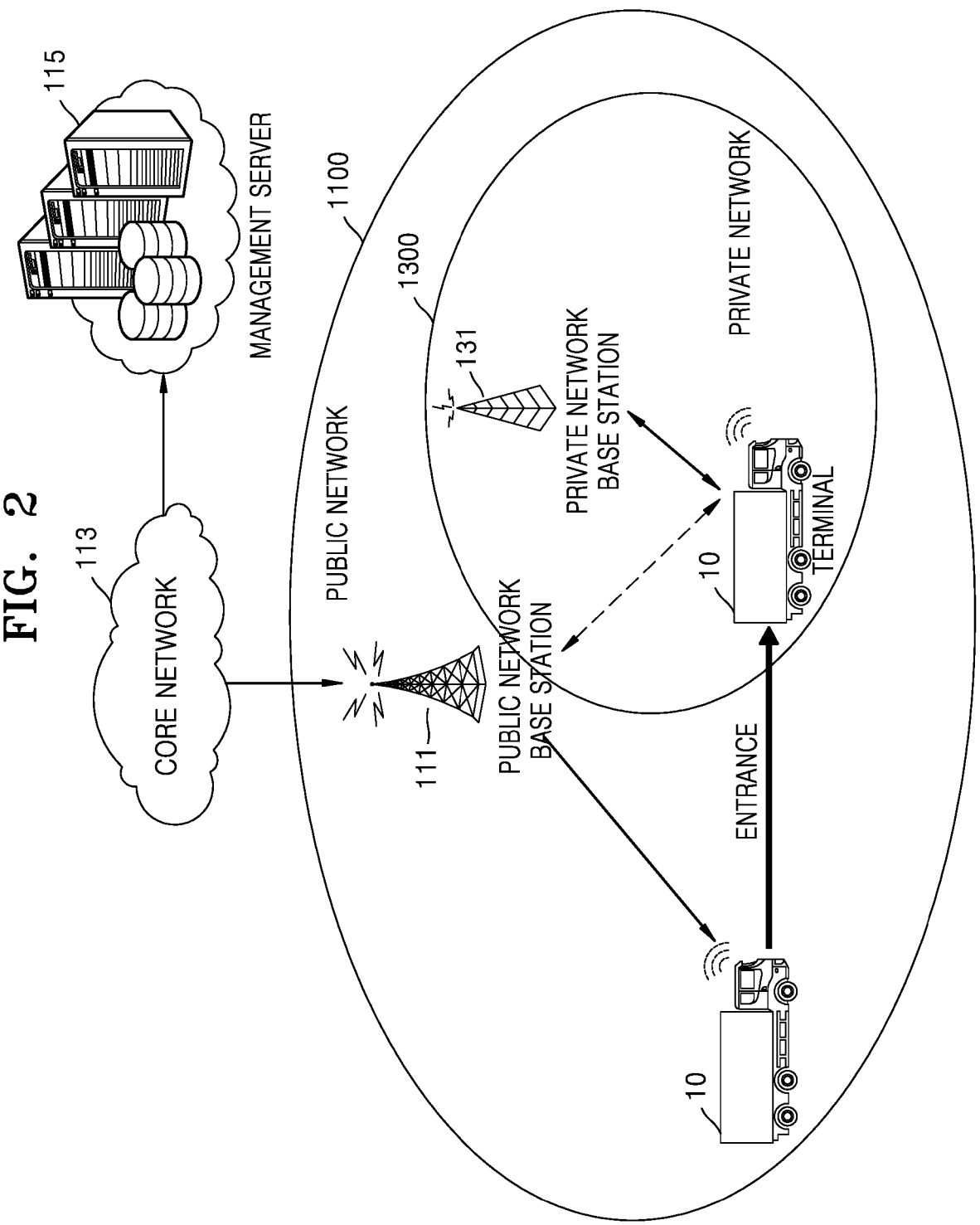
FIG. 2 is a view for describing a network connection method according to an embodiment of the disclosure.

FIG. 2 is a view for describing a network connection method according to an embodiment of the disclosure.

Referring to FIG. 2, a network connection method according to an embodiment of the disclosure is a method in which, when the terminal 10 connected to the public network base station 111 enters a range of the private network 1300, the terminal 10 accesses the private network base station 131 according to a predetermined procedure. In this case, the terminal 10 may release a connection to the public network base station 111 while accessing the private network base station 131, or may access the private network base station 131 while maintaining the connection to the public network base station 111.

In more detail, the terminal 10 connected to the public network base station 111 may obtain information necessary to access the private network 1300 from the management server 115 before entering the range of the private network 1300. In an embodiment of the disclosure, the information necessary to access the private network 1300 may include identification information of the private network 1300 to be accessed and information about a network slice allowed for the terminal 10 by the private network 1300 to be accessed. The terminal 10 may directly obtain the information necessary to access the private network 1300 from the management server 115, or may obtain the information necessary to access the private network 1300 through another device, for example, a gate device. A process of obtaining the information necessary to access the private network 1300 through the gate device will be described again below.

The terminal 10 obtaining the information necessary to access the private network 1300 may access the allowed network slice of the private network 1300 based on the obtained information. In more detail, the terminal 10 may receive network information broadcast from the private network base station 131, may compare the network information with the information necessary to access the private network 1300 obtained from the management server 115, and may determine whether the two pieces of information correspond to each other or are identical to each other. When the network information received from the private network base station 131 and the information necessary to access the private network 1300 obtained from the management server 115 correspond to each other or are identical to each other, the terminal 10 may access the allowed network slice of the private network 1300. A more detailed network connection process will now be described with reference to FIGS. 3 and 4.

Figure 3:
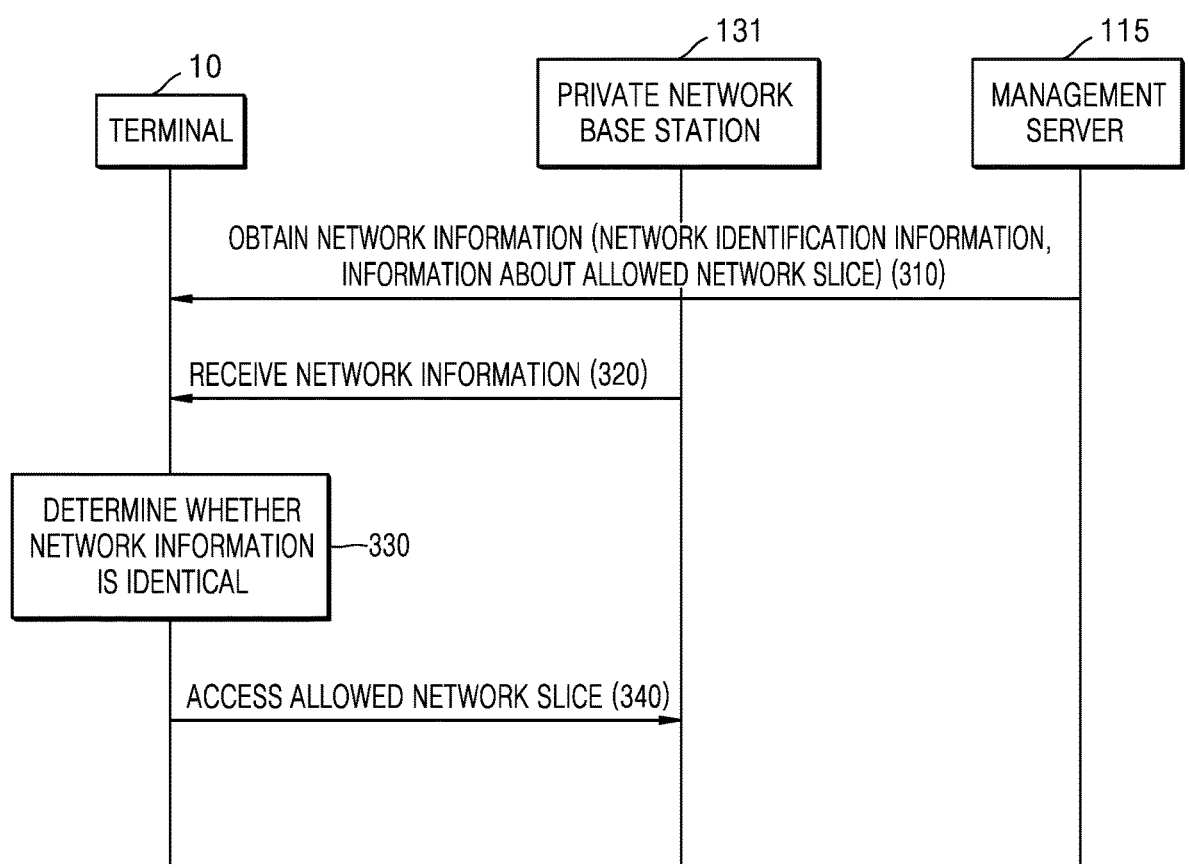
FIG. 3 is a flowchart of a network connection method according to an embodiment of the disclosure.

FIG. 3 is a flowchart of a network connection method according to an embodiment of the disclosure.

Referring to FIG. 3, first, in operation 310, the terminal 10 may obtain information necessary to access the private network 1300 from the management server 115. In an embodiment of the disclosure, the information necessary to access the private network 1300 may include identification information of the private network 1300 to be accessed and information about a network slice allowed for the terminal 10 by the private network 1300 to be accessed. The information about the network slice may include slice service type (SST) information and slice differentiation (SD) information. The information about the network slice will be described below in more detail with reference to FIG. 13.

In an embodiment of the disclosure, the terminal 10 may directly receive the information necessary to access the private network 1300 from the management server 115. In this case, the terminal 10 may receive the information necessary to access the private network 1300 from the management server 115 based on identification information and position information of the terminal 10. Also, the terminal 10 may receive the information necessary to access the private network 1300 through another device, for example, a gate device. In this case, the terminal 10 may receive the information necessary to access the private network 1300 from another device. For example, the terminal 10 may receive the identification information of the private network 1300 to be accessed from the gate device, and may receive the information about the network slice allowed for the terminal 10 by the private network 1300 to be accessed from the management server 115.

In operation 320, the terminal 10 may receive network information from the private network base station 131. In an embodiment of the disclosure, the private network base station 131 may broadcast network identification information periodically or non-periodically, and the terminal 10 may detect a broadcast signal. The private network base station 131 may notify the presence of the private network 1300 by broadcasting the network identification information, and may support access of the terminal 10 to the private network base station 131.

In operation 330, the terminal 10 may compare network information obtained from the management server 115 with the network information received from the private network base station 131 and may determine whether the two pieces of information correspond to each other or are identical to each other. In more detail, the terminal 10 may compare network identification information received from the management server 115 with the network identification information received from the private network base station 131 and may determine whether the two pieces of information correspond to each other or are identical to each other. When the network identification information received from the management server 115 and the network identification information that is broadcast are identical to each other, it may be determined that the terminal 10 has to access a corresponding network.

In operation 340, the terminal 10 accesses the private network base station 131. In more detail, the terminal 10 may access the allowed network slice of the private network 1300. In this case, the terminal 10 may access the allowed network slice of the private network 1300 based on the information about the allowed network slice obtained in operation 310.

According to an embodiment of the disclosure, network security may be improved by allowing only access to the network slice allowed for the terminal 10.

As described above, the private network 1300 which only an authorized user may access may be used in, for example, a factory, a military base, or a company. The following will be described on the assumption that the private network 1300 is a factory network. However, the disclosure is not limited thereto and may be applied to various fields.

Figure 4:
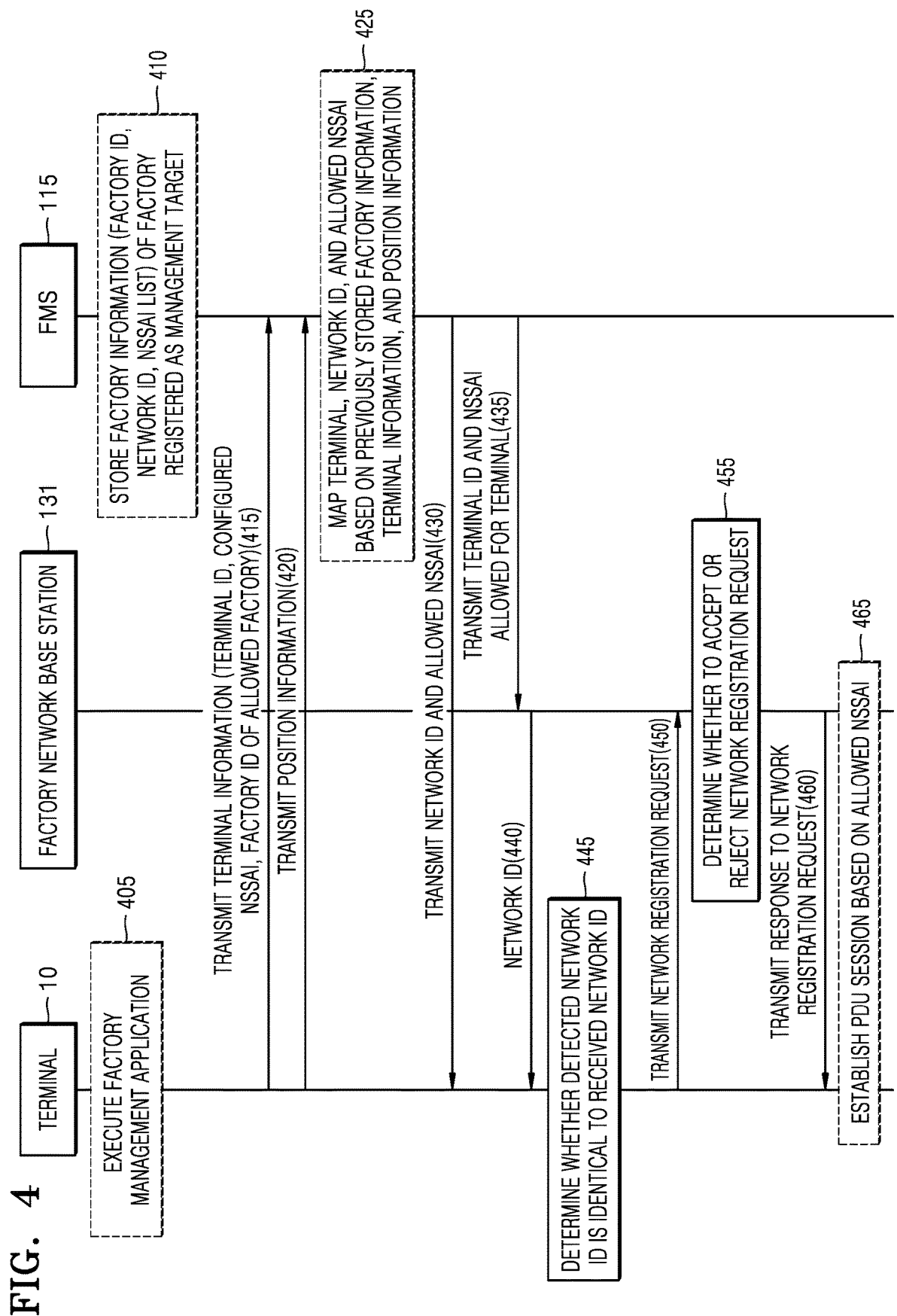
FIG. 4 is a flowchart of a network connection method according to another embodiment of the disclosure.

FIG. 4 is a flowchart of a network connection method according to another embodiment of the disclosure.

FIG. 4 will be described on the assumption that the private network 1300 is a factory network. In FIG. 4, the private network 1300 may be referred to as a factory network, the management server 115 may be referred to as a factory management server (FMS), and the private network base station 131 may be referred to as a factory network base station.

Referring to FIG. 4, in operation 405 the terminal 10 may execute a factory management application according to a user input or a pre-set value. The factory management application may check an address of the FMS 115 to be connected. For example, the factory management application may check an address of the FMS 115 stored in the terminal 10. In an embodiment of the disclosure, a user may perform an authentication process such as login or personal authentication on the factory management application, and it may be determined that the user is a user of the terminal 10. However, operation 405 is not an essential step and may be omitted. That is, the network connection method according to an embodiment of the disclosure may be performed without executing the factory management application.

In operation 410, the FMS 115 may store factory information of a factory registered as a management target such as factory identification (ID), network ID of the factory, and network slice selection assistance information (NSSAI). In an embodiment of the disclosure, the FMS 115 may update the factory information periodically or non-periodically, and the factory information may be stored in a database of the FMS 115. However, operation 410 is not an essential step and may be omitted as needed. For example, the FMS 115 may not store the factory information and may obtain the factory information from another server or storage device as needed.

In operation 415, the terminal 10 transmits terminal information to the FMS 115. In an embodiment of the disclosure, the terminal information may include terminal ID, NSSAI configured in the terminal 10, and factory ID of a factory allowed for the terminal 10.

Next, in operation 420, the terminal 10 may transmit position information to the FMS 115. In an embodiment of the disclosure, the terminal 10 may transmit the position information periodically or non-periodically according to a pre-set value. For example, when the terminal 10 moves by a predetermined distance or more, the terminal 10 may transmit the position information to the FMS 115.

In operation 425, the FMS 115 may map network ID to be accessed by the terminal 10 and NSSAI allowed for the terminal 10 based on the terminal information and the position information received from the terminal 10 and the factory information that is previously stored.

According to an embodiment of the disclosure, network security may be improved by granting a specific terminal access to a specific network slice through the above process.

Next, in operation 430, the FMS 115 may transmit the network ID to be accessed by the terminal 10 and the NSSAI allowed for the terminal 10 to the terminal 10. In operation 435, the FMS 115 may transmit the terminal ID and the NSSAI allowed for the terminal 10 to the factory network base station 131.

In an embodiment of the disclosure, the NSSAI allowed for the terminal 10 may vary according to a position, a time, and a task. For example, the terminal 10 may access only a network slice A in a specific area of the factory, and may access only a network slice B in another specific area. Alternatively, the terminal 10 may access only a network slice C in the morning, and may access only a network slice D in the afternoon. Furthermore, the terminal 10 may access only a network slice E when the terminal 10 loads goods, and the terminal 10 may access only a network slice F when the terminal 10 unloads goods. Various conditions may be included in the allowed NSSAI transmitted to the terminal 10. Furthermore, the FMS 115 may transmit the allowed NSSAI to the terminal 10 only when a corresponding condition is satisfied. For example, when the terminal 10 may access only the network slice C in the morning and may access only the network slice D in the afternoon, the terminal 10 may transmit NSSAI of the network slice C or the network slice D according to a current time.

In an embodiment of the disclosure, the FMS 115 may also transmit procedures necessary to access the allowed NSSAI while transmitting the NSSAI allowed for the terminal 10 to the terminal 10. For example, when the FMS 115 may access only the network slice A in a specific area of the factory and may access only the network slice B in another specific area of the factory, the FMS 115 may also transmit position information for accessing the network slice A and/or the network slice B to the terminal 10. Furthermore, in an embodiment of the disclosure, the FMS 115 may cause the allowed NSSAI to be displayed on the terminal 10 according to a task allocated to the terminal 10 while transmitting the NSSAI allowed for the terminal 10 to the terminal 10. For example, when the terminal 10 may access only the network slice E when the terminal 10 loads goods and the terminal 10 may access only the network slice F when the terminal 10 unloads goods and is allocated a task for loading new goods after the goods carried by the terminal 10 are unloaded, a condition may be set so that the network slice E is displayed on the terminal 10 until the terminal 10 unloads the goods and the network slice F is displayed on the terminal 10 after the terminal 10 unloads all of the goods.

In operation 440, the factory network base station 131 may transmit network ID to the terminal 10. In an embodiment of the disclosure, the factory network base station 131 may broadcast the network ID periodically or non-periodically, and the terminal 10 may detect a broadcast signal. The factory network base station 131 may notify the presence of the factory network 1300 by broadcasting the network ID, and may support access of the terminal 10 to the factory network base station 131.

Next, in operation 445, the terminal 10 may determine whether the detected network ID is identical to the network ID received from the FMS 115. When the network ID received from the FMS 115 is identical to the network ID that is broadcast, it may be determined that the terminal 10 has to access a corresponding network.

When the network ID detected by the terminal 10 is identical to the network ID received from the FMS 115 in operation 445, in operation 450, the terminal 10 transmits a network registration request to the factory network base station 131. Because the terminal 10 receives the allowed NSSAI from the FMS 115 in operation 430 and the factory network base station 131 also receives the NSSAI allowed for the terminal 10 from the FMS 115 in operation 435, in operation 445, the terminal 10 does not need to transmit again the allowed NSSAI to the factory network base station 131.

In operation 455, the factory network base station 131 may determine whether to accept or reject the network registration request. In an embodiment of the disclosure, the factory network base station 131 may determine whether to accept or reject the network registration request based on identification information of a connected candidate terminal that is previously stored and whether to enter the factory.

Next, in operation 460, the factory network base station 131 may transmit a response to the network registration request to the terminal 10.

When the response of the factory network base station 131 to the network registration request is the acceptance of the network registration request in operation 460, in operation 465, the terminal 10 and the factory network base station 131 may establish a protocol data unit (PDU) session based on the allowed NSSAI. In an embodiment of the disclosure, the terminal 10 may release a connection to the public network base station 111 while establishing the PDU session with the factory network base station 131.

Figure 5:
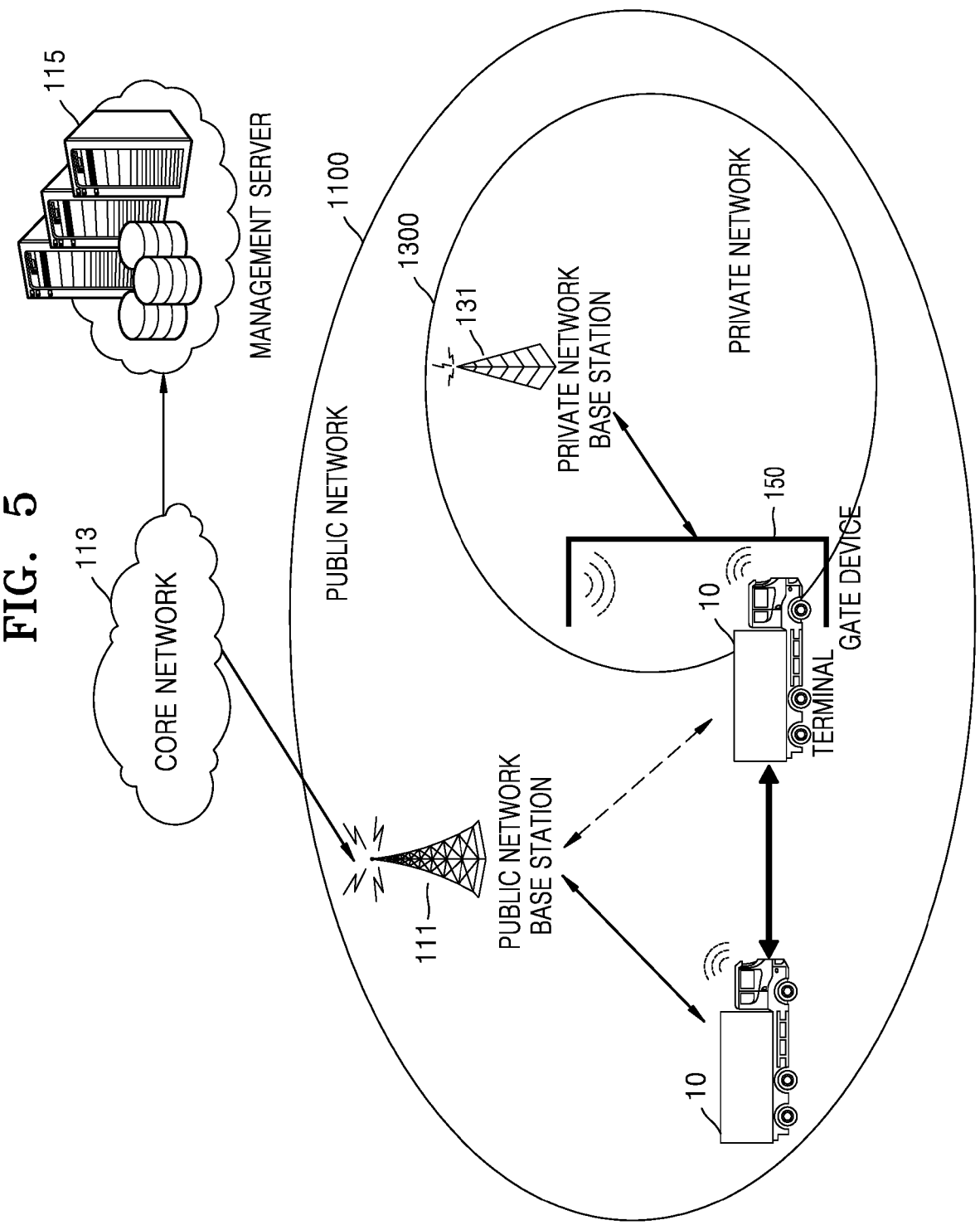
FIG. 5 is a view for describing a network connection method according to another embodiment of the disclosure.

FIG. 5 is a view for describing a network connection method according to another embodiment of the disclosure.

Referring to FIG. 5, a network connection method according to an embodiment of the disclosure relates to a method in which when the terminal 10 connected to the public network base station 111 enters a range of the private network 1300, the terminal 10 accesses the private network base station 131 according to a predetermined procedure. In more detail, the terminal 10 may further clarify whether to enter or exit the range of the private network 1300 by passing through a gate device 150. It is highly possible that the range of the private network 1300 and a private area do not match each other due to characteristics of a wireless signal. Accordingly, access to the private network 1300 may occur outside the private area, thereby leading to security problems. In an embodiment of the disclosure, however, whether the terminal 10 actually enters or exits the private area may be further clarified by using the gate device 150.

In this case, the terminal 10 may release a connection to the public network base station 111 while accessing the private network base station 131, or may access the private network base station 131 while maintaining the connection to the public network base station 111.

In more detail, the terminal 10 connected to the public network base station 111 has to pass through the gate device 150 in order to enter the private area. In this case, the terminal 10 may transmit identification information of the terminal 10 to the gate device 150 by performing short-range communication with the gate device 150. The gate device 150 may transmit the identification information of the terminal 10 to the management server 115 or the private network base station 131, and the management server 115 or the private network base station 131 receiving the identification information may determine that the terminal 10 actually enters the private area. In an embodiment of the disclosure, near-field communication (NFC) or radio frequency identification (RFID) may be used as short-range communication. Because short-range communication requires a short distance between communication entities, when the terminal 10 performs short-range communication with the gate device 150, it may mean that the terminal 10 is located at almost the same position as the gate device 150. Accordingly, the management server 115 or the private network base station 131 receiving the identification information of the terminal 10 from the gate device 150 may determine that the terminal 10 passes through the gate device 150 and enters the private area. Likewise, even when the terminal 10 exits the private area, the terminal 10 may transmit the identification information of the terminal 10 to the gate device 150 by performing short-range communication with the gate device 150. The gate device 150 may transmit the identification information of the terminal 10 to the management server 115 or the private network base station 131, and the management server 115 or the private network base station 131 receiving the identification information may determine that the terminal 10 actually exits the private area.

Also, the terminal 10 may obtain information necessary to access the private network 1300 from the gate device 150. In an embodiment of the disclosure, the terminal 10 may receive identification information of the private network 1300 to be accessed from the gate device 150 through short-range communication. As described above, when the terminal 10 performs short-range communication with the gate device 150, it may mean that the terminal 10 is located at almost the same position as the gate device 150. Accordingly, the terminal 10 may obtain identification information of a network which is accessible at a corresponding position by obtaining the identification information of the private network 1300 to be accessed from the gate device 150.

Even in this case, the terminal 10 may obtain other information necessary to access the private network 1300 from the management server 115. In an embodiment of the disclosure, the terminal 10 may receive information about a network slice allowed for the terminal 10 from the management server 115.

The terminal 10 obtaining the information necessary to access the private network 1300 may access the allowed network slice of the private network 1300 based on the obtained information. In more detail, the terminal 10 may receive network identification information that is broadcast from the private network base station 131, may compare the network identification information with the identification information of the private network 1300 received from the gate device 150, and may determine whether the two pieces of information correspond to each other or are identical to each other. When the network identification information received from the private network base station 131 and the network identification information received from the gate device 150 correspond to each other or are identical to each other, the terminal 10 may access the allowed network slice of the private network 1300. A more detailed network connection process will now be described with reference to FIGS. 6 and 7.

Figure 6:
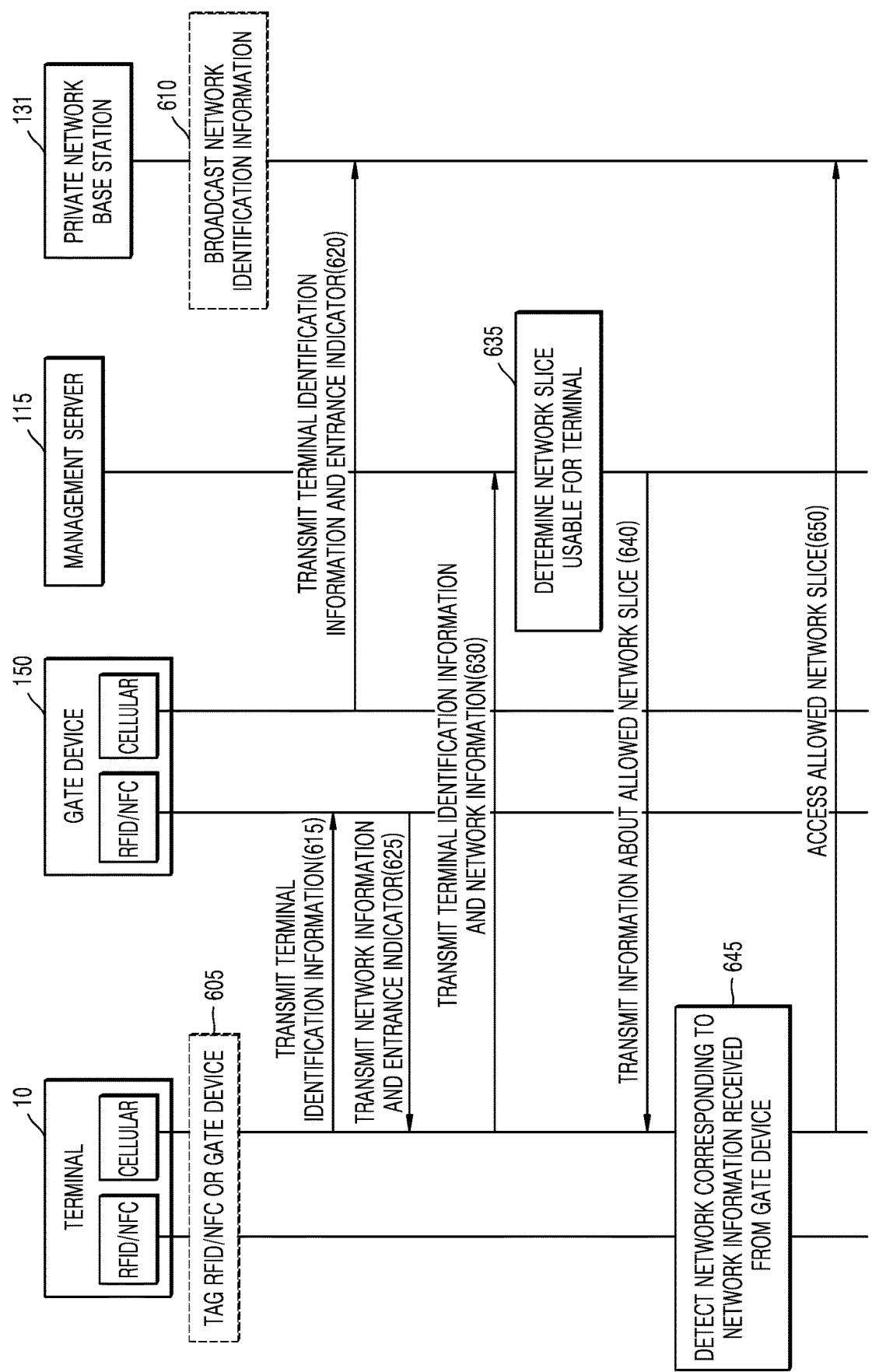
FIG. 6 is a flowchart of a network connection method according to another embodiment of the disclosure.

FIG. 6 is a flowchart of a network connection method according to another embodiment of the disclosure.

FIG. 6 relates to an embodiment for determining whether the terminal 10 actually enters a private area by using the gate device 150.

Referring to FIG. 6, first, in operation 605, the terminal 10 tags RFID or NFC to the gate device 150 while entering a private area. In an embodiment of the disclosure, because short-range communication such as RFID or NFC requires a short distance between communication entities, when the terminal 10 tags RFID or NFC to the gate device 150, it may mean that the terminal 10 is located at almost the same position as the gate device 150.

In operation 610, the private network base station 131 may broadcast network identification information. The private network base station 131 may notify the presence of the private network 1300 by broadcasting the network identification information, and may support access of the terminal 10 to the private network base station 131. Operation 610 is not necessarily performed after operation 605, and the network identification information is not necessarily broadcast only once. The private network base station 131 may broadcast the network identification information periodically or non-periodically.

In operation 615, the terminal 10 transmits terminal identification information to the gate device 150 by using short-range communication such as RFID or NFC. In operation 620, the gate device 150 transmits the terminal identification information received from the terminal 10 and an entrance indicator to the private network base station 131 by using a mobile communication system. The private network base station 131 receiving the terminal identification information and the entrance indicator may determine that the terminal 10 actually enters a private area. In operation 625, the gate device 150 may transmit network information, the entrance indicator, etc. to the terminal 10 by using short-range communication such as RFID or NFC. The terminal 10 receiving the network information, the entrance indicator, etc. starts network access according to a preset procedure.

Operations 615, 620, and 625 are not necessarily performed in the order listed above, and may be modified in various ways. For example, operation 625 in which the network information, the entrance indicator, etc. are transmitted to the terminal 10 by using short-range communication such as RFID or NFC may be performed before operation 615 in which the terminal 10 transmits the terminal identification information to the gate device 150 by using short-range communication such as RFID or NFC. Also, operation 620 in which the gate device 150 transmits the terminal identification information received from the terminal 10 and the entrance indicator to the private network base station 131 by using the mobile communication system and operation 625 in which the network information, the entrance indicator, etc. are transmitted to the terminal 10 by using short-range communication such as RFID or NFC may be simultaneously performed. However, operation 620 in which the terminal identification information and the entrance indicator are transmitted to the private network base station 131 may be performed after operation 615 in which the terminal identification information is received.

Also, although not shown in FIG. 6, the gate device 150 may transmit the terminal identification information and the entrance indicator to the management server 115. The management server 115 may determine that the terminal 10 actually enters the private area based on the terminal identification information and the entrance indicator.

In an embodiment of the disclosure, the network information may include network identification information of the private network 1300.

Next, in operation 630, the terminal 10 may transmit the network information received from the gate device 150 and the terminal identification information to the management server 115. In operation 635, the management server 115 may determine a network slice usable for the terminal 10 based on the terminal identification information and the network information received from the terminal 10. In operation 640, the management server 115 may transmit information about the allowed network slice to the terminal 10. In an embodiment of the disclosure, the information about the allowed network slice may include the information about the network slice determined in operation 635. In an embodiment of the disclosure, the terminal 10 may receive information necessary to access the private network 1300 from another device.

In operation 645, it is determined whether the network identification information detected by the terminal 10 is identical to the network identification information received from the management 115. When the network identification information received from the management server 115 is identical to the network identification information that is broadcast, it may be determined that the terminal 10 has to access a corresponding network.

In an embodiment of the disclosure, the terminal 10 may detect a network corresponding to the network information received from the gate device 150. That is, when the network identification information that is broadcast from the private network base station 131 and is detected by the terminal 10 is identical to the network identification information received from the gate device 150, in operation 650, the terminal 10 may access the allowed network slice.

According to an embodiment of the disclosure, whether the terminal 10 actually enters the private area may be more clarified by using the gate device 150.

Figure 7:
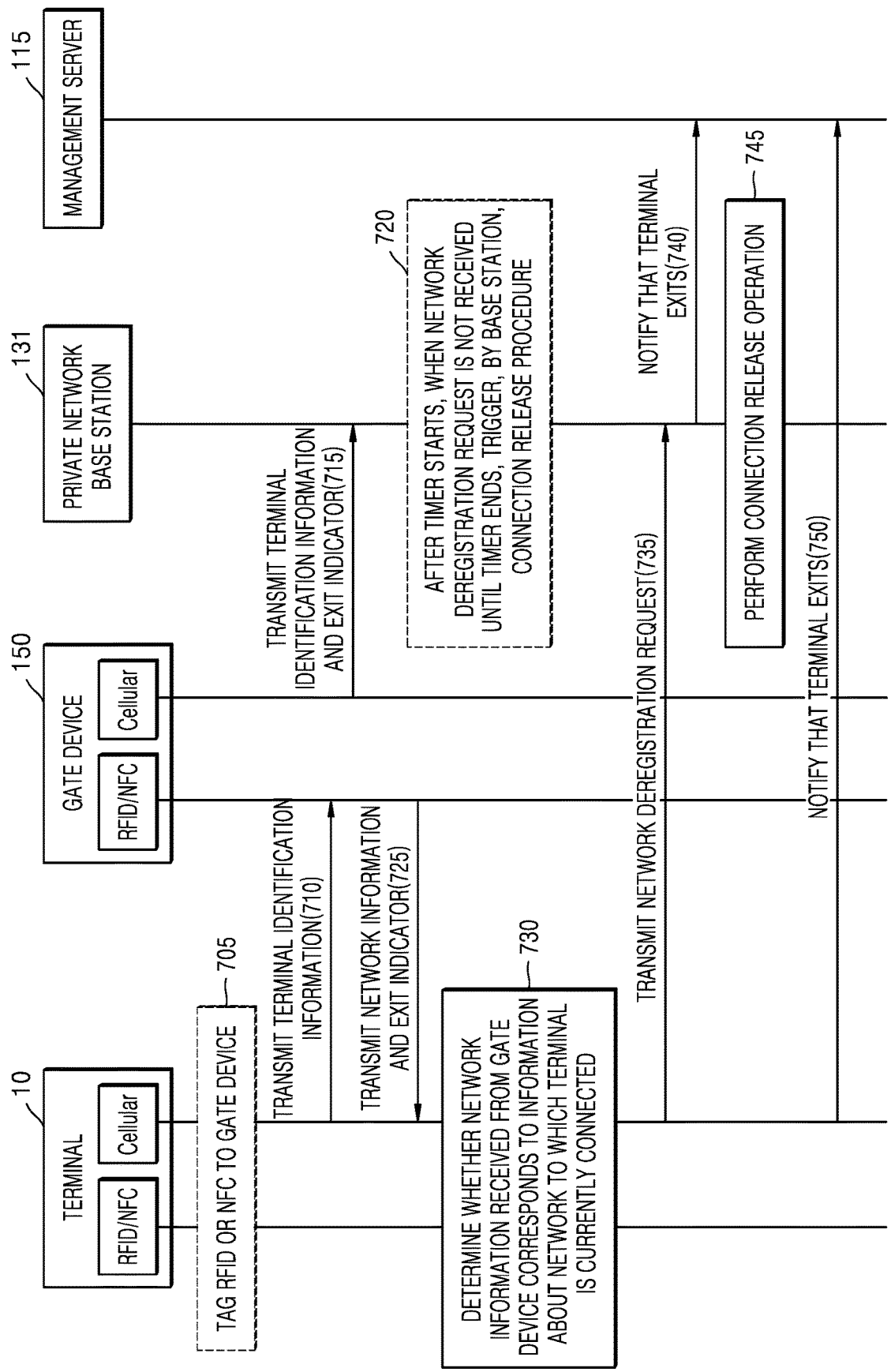
FIG. 7 is a flowchart of a network connection method according to another embodiment of the disclosure.

FIG. 7 is a flowchart of a network connection method according to another embodiment of the disclosure.

FIG. 7 relates to an embodiment for determining whether the terminal 10 actually exits a private area by using the gate device 150.

Referring to FIG. 7, first, in operation 705, the terminal 10 tags RFID or NFC to the gate device 150 while exiting a private area. In an embodiment of the disclosure, because short-range communication such as RFID or NFC requires a short distance between communication entities, when the terminal 10 tags RFID or NFC to the gate device 150, it may mean that the terminal 10 is located at almost the same position as the gate device 150.

In operation 710, the terminal 10 transmits terminal identification information to the gate device 150 by using short-range communication such as RFID or NFC. In operation 715, the gate device 150 transmits the terminal identification information received from the terminal 10 and an exit indicator to the private network base station 131 by using a mobile communication system. The private network base station 131 receiving the terminal identification information and the exit indicator may determine that the terminal 10 actually exits the private area.

In operation 720, the private network base station 131 receiving the terminal identification information and the exit indicator may start a timer, and when a network deregistration request is not received from the terminal 10 until the timer ends, the private network base station 131 may directly trigger a connection release procedure. However, operation 720 may be optionally performed, and even after the private network base station 131 receives the terminal identification information and the exit indicator, the private network base station 131 does not necessarily start the timer.

In operation 725, the gate device 150 may transmit network information, the exit indicator, etc. to the terminal 10 by using short-range communication such as RFID or NFC. The terminal 10 receiving the network information, the exit indicator, etc. starts network access according to a pre-set procedure.

Operations 710, 715, and 725 are not necessarily performed in the order listed above, and may be modified in various ways. For example, operation 725 in which the network information, the exit indicator, etc. are transmitted to the terminal 10 by using short-range communication such as RFID or NFC may be performed before operation 710 in which the terminal 10 transmits the terminal identification information to the gate device 150 by using short-range communication such as RFID or NFC. Also, operation 715 in which the gate device 150 transmits the terminal identification information received from the terminal 10 and the exit indicator to the private network base station 131 by using the mobile communication system and operation 725 in which the network information, the exit indicator, etc. are transmitted to the terminal 10 by using short-range communication such as RFID or NFC may be performed simultaneously. However, operation 715 in which the terminal identification information and the exit indicator are transmitted to the private network base station 131 may be performed after operation 710 in which the terminal identification information is received.

Also, although not shown in FIG. 7, the gate device 150 may directly transmit the terminal identification information and the exit indicator to the management server 115. The management server 115 may determine that the terminal 10 actually exits the private area based on the terminal identification information and the exit indicator.

In an embodiment of the disclosure, the network information may include network identification information of the private network 1300.

In operation 730, it may be determined whether network identification information of a network to which the terminal 10 is currently connected is identical to the network identification information received from the gate device 150. When the network identification information received from the gate device 150 is identical to the network identification information of the network to which the terminal 10 is currently connected, the terminal 10 may determine that a network connection has to be released.

Next, in operation 735, the terminal 10 may transmit a network deregistration request to the private network base station 131. The private network base station 131 receiving the network deregistration request may notify the management server 115 that the terminal 10 exits the private area in operation 740, and may perform a connection release operation on the terminal 10 in operation 745.

In operation 750, the terminal 10 may also notify the management server 115 that the terminal 10 exits the private area.

According to an embodiment of the disclosure, whether the terminal 10 exits the private area may be more clarified by using the gate device 150.

Figure 8:
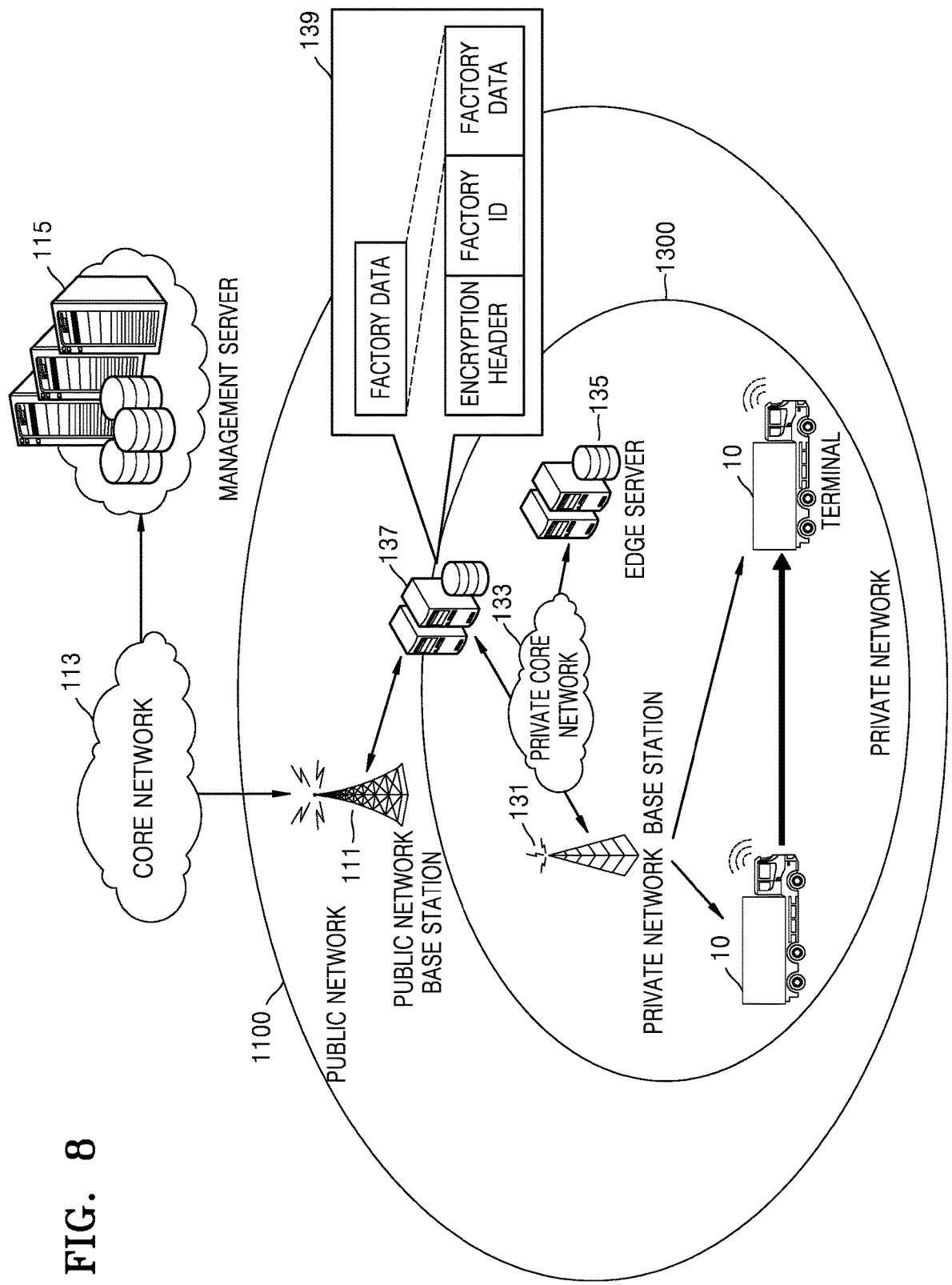
FIG. 8 is a view for describing a network connection method according to another embodiment of the disclosure.

FIG. 8 is a view for describing a network connection method according to another embodiment of the disclosure.

FIG. 8 is a view for describing a method of using an interworking server 137 for interworking between the private network 1300 and the public network 1100.

The interworking server 137 is connected to the private core network 133 and the public network base station 111 and performs an operation for interworking between the private network 1300 and the public network 1100. In an embodiment of the disclosure, the interworking server 137 may encrypt data processed by the edge server 135 included in the private network 1300 and transmitted to an external network, for example, the public network 1100, and may change a data format. Also, in contrast, the interworking server 137 may receive encrypted data from the external network, for example, the public network 1100, may decrypt the received data, and may transmit the decrypted data to the edge server 135 through the private core network 133.

According to an embodiment of the disclosure, security may be maintained and interworking between the private network 1300 and the external network may be performed by enabling the interworking server 137 to encrypt and decrypt data.

In more detail, when the terminal 10 enters a private area and is connected to the private network 1300, the edge server 135 may check a task processing result of a task allocated to the terminal 10. For example, when the private network 1300 is a factory network, the edge server 135 may check loading/unloading of goods, goods receipt, distribution information, etc. from the terminal 10. Furthermore, the edge server 135 may check information such as factory production, goods management, and resource allocation through the factory network. The edge server 135 may transmit/receive necessary information to/from the management server 115 located outside the factory network through the interworking server 137 as needed. Alternatively, the terminal 10 may directly transmit/receive necessary information to/from the management server 115 located outside the factory network through the interworking server 137. In this case, the private core network 133 may check a destination of each transmitted information and may transmit the information to the interworking server 137 or the edge server 135.

The interworking server 137 may encrypt data transmitted to the outside of the factory network and may decrypt data received from the outside of the factory network. In an embodiment of the disclosure, the interworking server 137 may encrypt data, may add factory ID and encryption header to the data, and then may transmit the data to the management server 115. The management server 115 may decrypt the received data. In contrast, the management server 115 may encrypt data, may add factory ID and encryption header to the data in operation 139, and may transmit the data to the interworking server 137. The interworking server 137 may decrypt the received data.

According to an embodiment of the disclosure, the private network 1300 may safely interoperate with an external network safely by using the interworking server 137.

Figure 9:
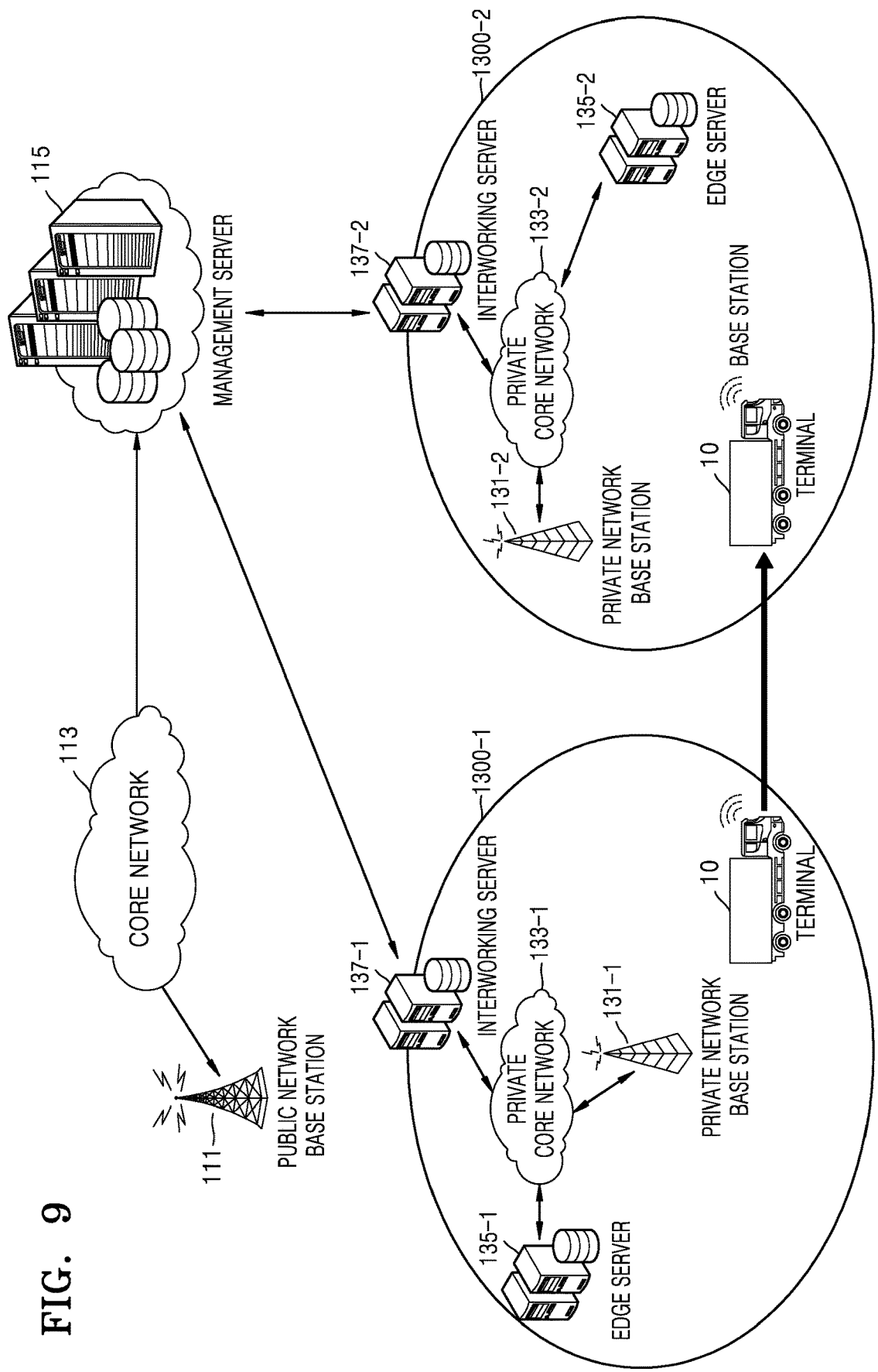
FIG. 9 is a view for describing a network connection method according to another embodiment of the disclosure.

FIG. 9 is a view for describing a network connection method according to another embodiment of the disclosure.

FIG. 9 is a view for describing a method of integratedly managing a private network by using the management server 115.

Referring to FIG. 9, a first private network 1300-1 including a first interworking server 137-1, a first private core network 133-1, a first private network base station 131-1 and a first edge server 135-1. A second private network 1300-2 including a second interworking server 137-2, a second private core network 133-2, a second private network base station 131-2 and a second edge server 135-2. The first private network 1300-1 and the second private network 1300-2 may be connected to one management server 115, and the management server 115 may manage the first private network 1300-1 to the second private network 1300-2. Although two private networks are connected to one management server 115 in FIG. 9, the disclosure is not limited thereto and various modifications may be made. For example, three or more private networks may be connected to one management server 115, or a plurality of private networks may be connected to a plurality of management servers. In this case, an additional server for integratedly managing the plurality of management servers may exist. The first private network 1300-1 and the second private network 1300-2 may be connected to the management server 115 respectively through a first interworking server 137-1 and a second interworking server 137-2 and may transmit/receive encrypted data to/from the management server 115.

Also, the terminal 10 may process a task by moving from the first private network 1300-1 to the second private network 1300-2, and the management server 115 may manage an overall operation of the private networks by transmitting/receiving various information including the task processing of the terminal 10.

The following will be described on the assumption that the private network 1300 is a factory network. When the terminal 10 exits the first factory network 1300-1, movement information of the terminal 10 may be transmitted through the first interworking server 137-1 to the management server 115. The management server 115 receiving the movement information of the terminal 10 may check a next destination of the terminal 10, and then may transmit the movement information of the terminal 10 to the second factory network 1300-2 corresponding to the next destination. The second factory network 1300-2 may receive the movement information of the terminal 10, may allocate a resource for the terminal 10 in advance, and may prepare information and a procedure necessary for authentication.

According to an embodiment of the disclosure, information may be exchanged between distributed networks. A more detailed network connection process will now be described with reference to FIG. 10.

Figure 10:
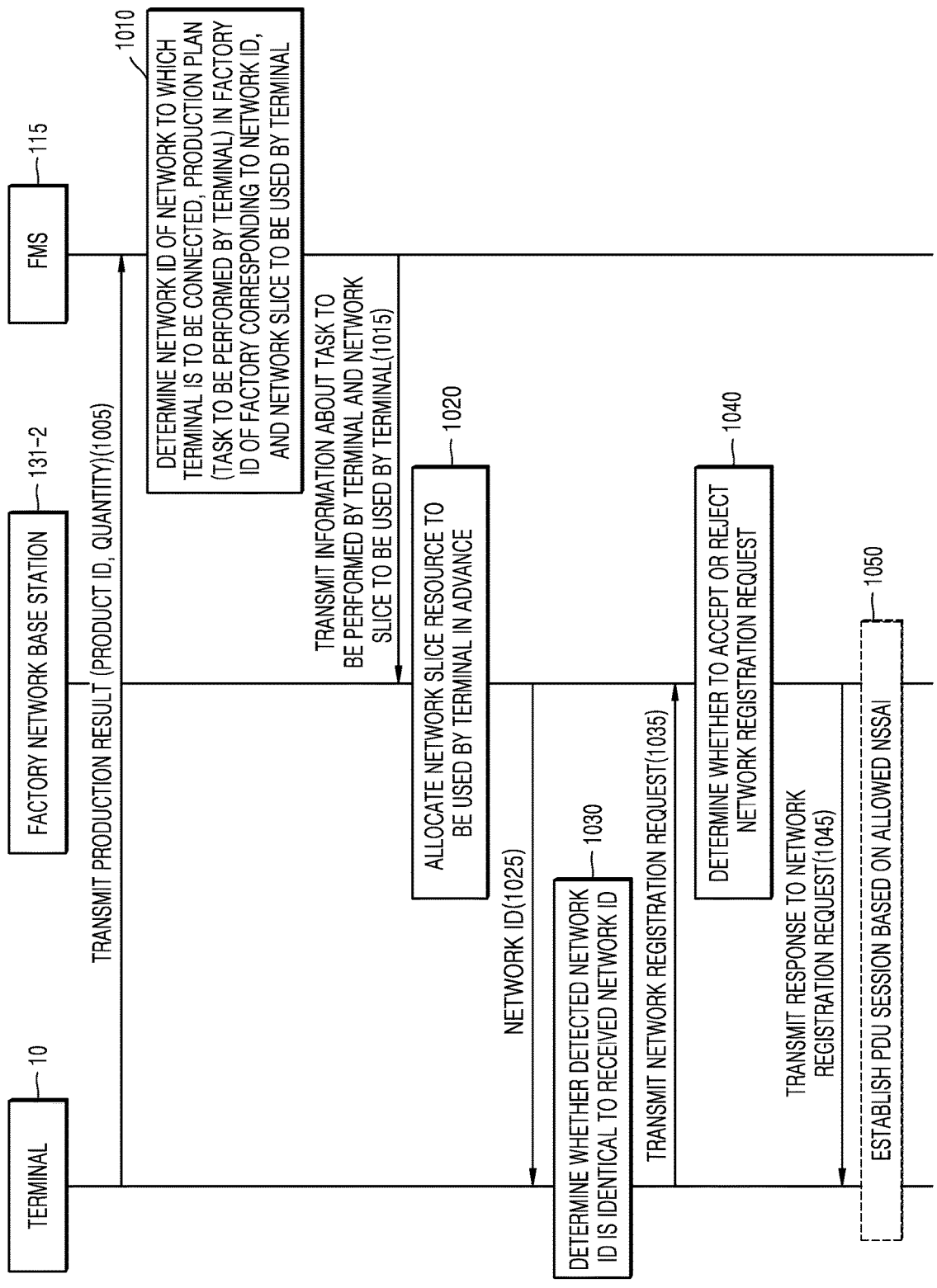
FIG. 10 is a flowchart of a network connection method according to another embodiment of the disclosure.

FIG. 10 is a flowchart of a network connection method according to another embodiment of the disclosure.

FIG. 10 will be described on the assumption that the private network 1300 is a factory network.

Referring to FIG. 10, the private network 1300 may be referred to as a factory network, the management server 115 may be referred to as an FMS, and the private network base station 131 may be referred to as a factory network base station.

In operation 1005, the terminal 10 may transmit a task processing result of a first factory network and movement information to the FMS 115. In more detail, the terminal 10 may transmit a production result in a first factory such as loaded product ID and the quantity of products and goods movement information such as destination factory ID of the products to the FMS 115.

In operation 1010, the FMS 115 may determine network ID of a network to which the terminal 10 is to be connected, a production plan (task to be performed by the terminal 10) in factory ID of a factory corresponding to the network ID, and a network slice to be used by the terminal 10, based on information received from the terminal 10.

Next, in operation 1015, the FMS 115 transmits information about the task to be performed by the terminal 10 and the network slice to be used by the terminal 10 to a second factory network base station 131-2. In operation 1020, the second factory network base station 131-2 may allocate a network slice resource to be used by the terminal 10 in advance based on information received from the FMS 115.

Next, in operation 1025, the second factory network base station 131-2 may transmit network ID to the terminal 10. In an embodiment of the disclosure, the second factory network base station 131-2 may broadcast the network ID periodically or non-periodically, and the terminal 10 may detect a broadcast signal. The second factory network base station 131-2 may notify the presence of the second factory network 1300-2 by broadcasting the network ID, and may support access of the terminal 10 to the second factory network base station 131-2.

Next, in operation 1030, the terminal 10 may determine whether the detected network ID is identical to the network ID received from the FMS 115. When the network ID received from the FMS 115 is identical to the network ID that is broadcast, it may be determined that the terminal 10 has to access a corresponding network.

When the network ID detected by the terminal 10 is identical to the network ID received from the FMS 115 in operation 1030, in operation 1035, the terminal 10 transmits a network registration request to the second factory network base station 131-2.

In operation 1040, the factory network base station 131 may determine whether to accept or reject the network registration request. In an embodiment of the disclosure, because the second factory network base station 131-2 allocates the network slice resource to be used by the terminal 10 in advance based on the information received from the FMS 115 in operation 1020, the second factory network base station 131-2 may determine whether to accept or reject the network registration request based on only identification information of the terminal 10.

Next, in operation 1045, the factory network base station 131 may transmit a response to the network registration request to the terminal 10.

When the response to the registration request is the acceptance of the network registration request in operation 1045, in operation 1050, the factory network base station 131 may establish a PDU session based on the network slice resource that is allocated in advance. In an embodiment of the disclosure, the terminal 10 may release a connection to the public network base station 111 while establishing the PDU session.

According to an embodiment of the disclosure, information may be exchanged between distributed networks.

Figure 11:
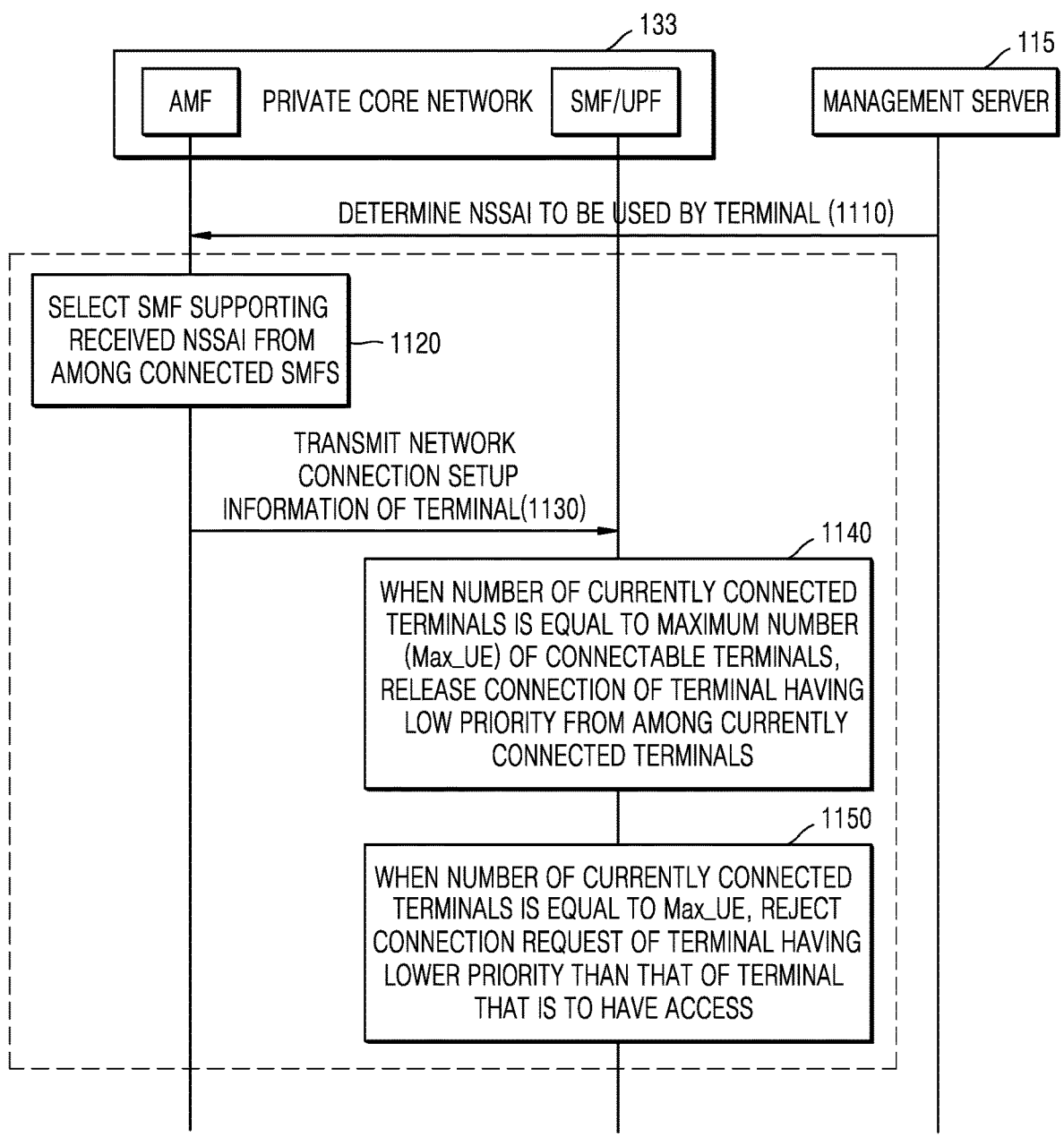
FIG. 11 is a flowchart of a method of allocating a network slice resource according to an embodiment of the disclosure.

FIG. 11 is a flowchart of a method of allocating a network slice resource according to an embodiment of the disclosure.

Referring to FIG. 11, the private core network 133 may include an AMF, SMFs, and user plane functions (UPFs).

First, in operation 1110, the management server 115 may determine NSSAI to be used by the terminal 10 and may transmit the NSSAI to the AMF of the private core network 133.

In operation 1120, the AMF of the private core network 133 may select an SMF (or a UPF) that supports the received NSSAI from among the SMFs (or the UPFs) connected to the AMF. Next, in operation 1130, the AMF transmits network connection setup information of the terminal 10 to the SMF (or the UPF).

In operation 1140, when the number of currently connected terminals is equal to the maximum number (Max UE) of connectable terminals, the SMF (or the UPF) may release a connection of a terminal having a low priority from among the currently connected terminals. Alternatively, in operation 1150, when the number of currently connected terminals is equal to the maximum number (Max UE) of connectable terminals, the SMF (or the UPF) may reject a connection request of a terminal having a lower priority than that of a terminal that is to have access. Operations 1140 and 1150 may be selectively performed.

According to an embodiment of the disclosure, a network slice resource may be allocated according to a priority.

Figure 12:
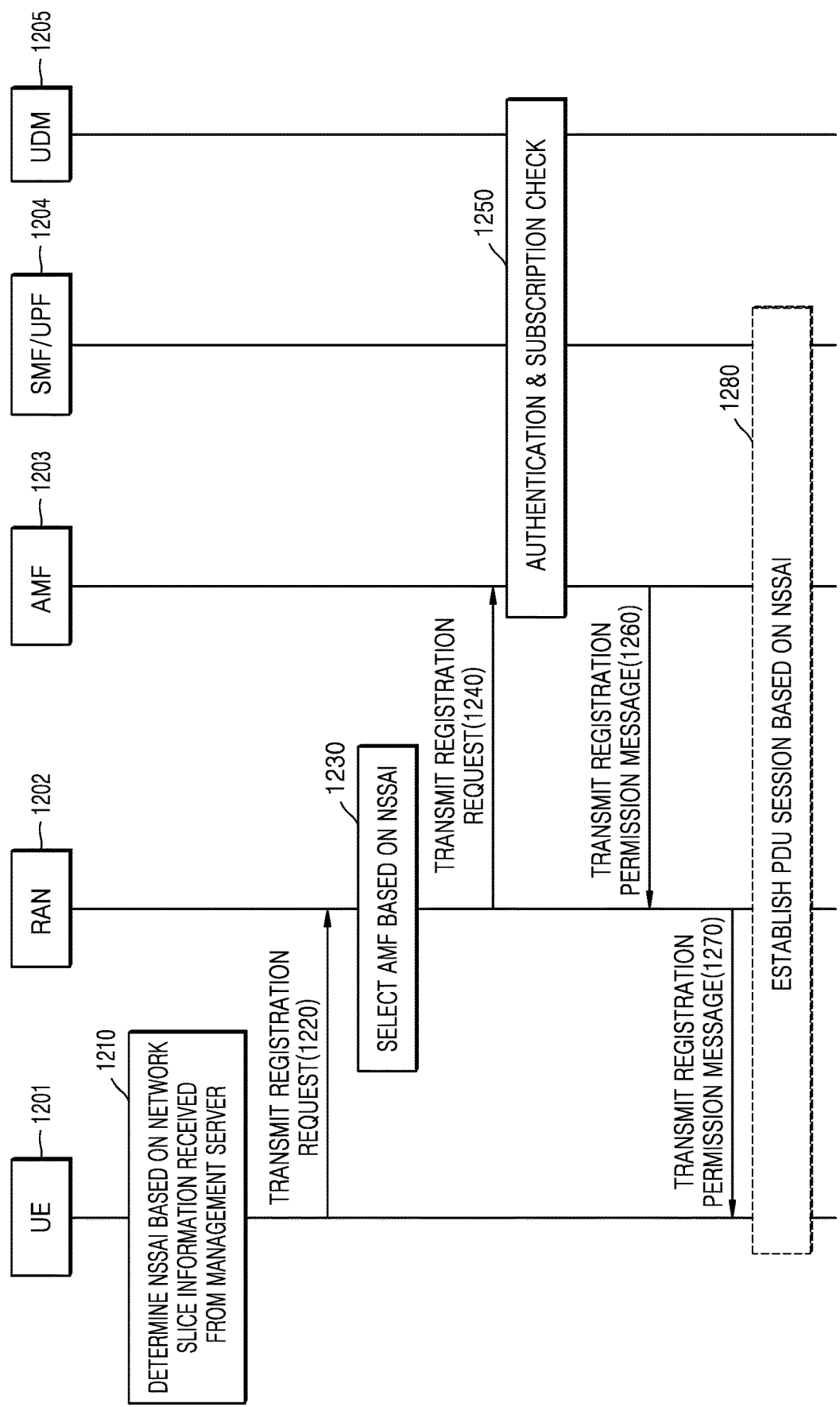
FIG. 12 is a flowchart of a network registration procedure according to an embodiment of the disclosure.

FIG. 12 is a flowchart of a network registration procedure according to an embodiment of the disclosure.

Referring to FIG. 12, first, in operation 1210, a UE 1201 may determine NSSAI necessary to access a network based on network slice information received from a management server. In an embodiment of the disclosure, the UE 1201 may determine the NSSAI necessary to access the network from among pieces of NSSAI that are initially configured.

Next, in operation 1220, the UE 1201 transmits a registration request to a radio access network (RAN) 1202. In this case, the UE 1201 may transmit also the NSSAI that is determined to be necessary to access the network.

In operation 1230, the RAN 1202 may select an AMF 1203 based on the NSSAI received from the UE 1201. Next, in operation 1240, the RAN 1202 transmits the registration request to the selected AMF 1203. In this case, the RAN 1202 may also transmit the NSSAI.

In operation 1250, the AMF 1203 receiving the registration request may perform authentication and subscription check with an entity such as an SMF/UPF 1204 or a user data management (UDM) 1205. When the authentication and the subscription check are performed in operation 1250, in operation 1260, the AMF 1203 transmits a registration permission message to the RAN 1202. In this case, the AMF 1203 may also transmit allowed NSSAI.

In operation 1270, the RAN 1202 transmits the registration permission message to the UE 1201. In this case, the RAN 1202 may also transmit the allowed NSSAI.

In operation 1280, the UE 1201, the RAN 1202, the AMF 1203, and the SMF/UPF 1204 may establish a PDU session based on the allowed NSSAI.

FIG. 13 is a view illustrating information about a network slice according to an embodiment of the disclosure.

Information about a network slice may include information for identifying a specific network slice. Also, the information about the network slice may include SST information, SD information, etc. In this case, the SD information may differentiate the same SST according to a set criterion, and may be selectively included in the information about the network slice.

Referring to FIG. 13, it is found that different SST values are assigned to SSTs. In more detail, according to SSTs, enhanced mobile broadband (eMBB) may have an SST value of 1, ultra reliable low latency communication (URLLC) may have an SST value of 2, mobile internet of things (MIoT) may have an SST value of 3, and Factory may have an SST value of 4.

Referring to FIG. 13, eMBB, URLLC, and MIoT do not have SD information whereas a factory may have SD information that is classified according to a function. For example, when an SST is a factory, the factory may include SD information that is classified into Control, Monitoring, Management, and Urgent. Also, the disclosure is not limited thereto, and the factory may include SD information that is classified according to a criterion such as a position or a time.

Figure 14:
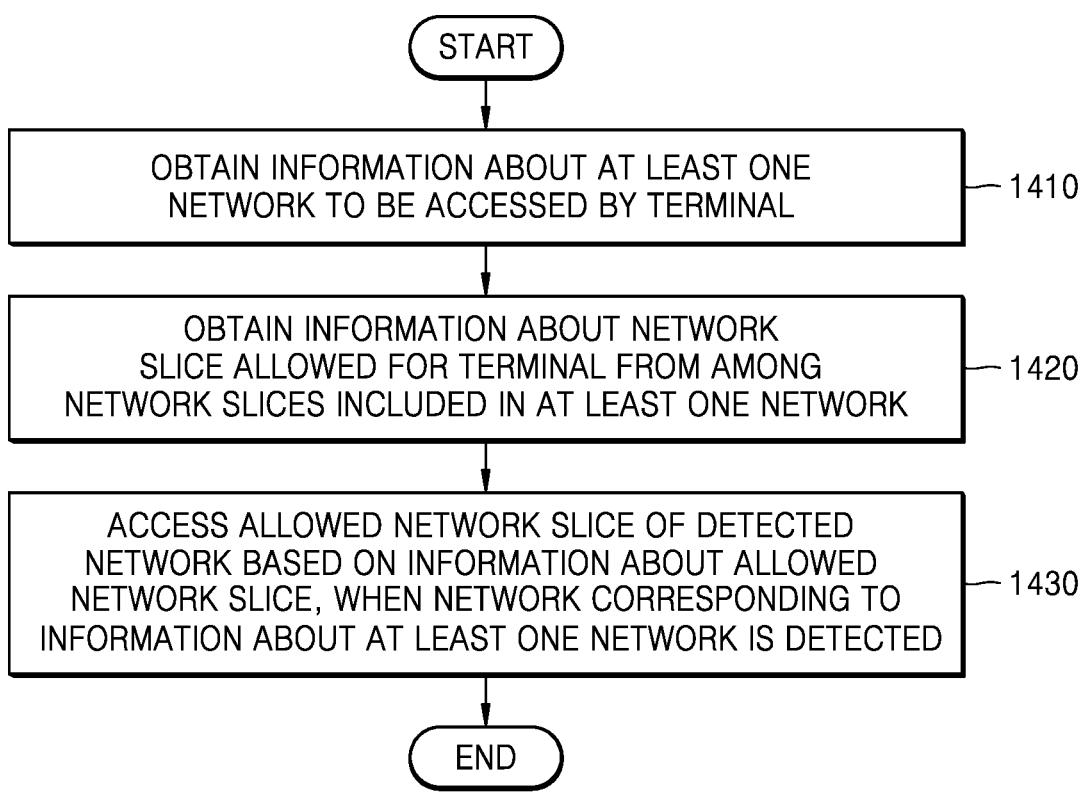
FIG. 14 is a flowchart of a network connection method of a terminal according to an embodiment of the disclosure.

FIG. 14 is a flowchart of a network connection method of a terminal according to an embodiment of the disclosure.

Referring to FIG. 14, in operation 1410, the terminal may obtain information about at least one network to be accessed by the terminal. In an embodiment of the disclosure, the terminal may transmit identification information of the terminal to a gate device by using short-range communication, and may receive the information about the at least one network to be accessed by the terminal and an entrance indicator by using short-range communication from the gate device. Also, in an embodiment of the disclosure, the terminal may transmit position information and the identification information of the terminal to a management server, and may receive the information about the at least one network to be accessed by the terminal that is determined based on the position information of the terminal from the management server. The information about the at least one network to be accessed by the terminal may include network ID.

In an embodiment of the disclosure, the short-range communication may include RFID and NFC.

Next, in operation 1420, the terminal may obtain information about a network slice allowed for the terminal from among network slices included in the at least one network. In an embodiment of the disclosure, the terminal may transmit the information about the at least one network received from the gate device and the identification information of the terminal to the management server, and may receive the information about the network slice allowed for the terminal from the management server.

In an embodiment of the disclosure, the information about the allowed network slice may include SST information and SD information.

In operation 1430, when a network corresponding to the information about the at least one network is detected, the terminal may access the allowed network slice of the detected network based on the information about the allowed network slice. The terminal may compare the information about the at least one network obtained in operation 1410 with information about of the detected network and may determine whether the two pieces of information correspond to each other or are identical to each other.

In an embodiment of the disclosure, the terminal may access the allowed network slice of the detected network based on the SST information and the SD information. In this case, the terminal may release a connection to an existing network, or may access the allowed network slice of the detected network while maintaining the connection to the existing network.

In an embodiment of the disclosure, the terminal may transmit the identification information of the terminal to the gate device by using short-range communication, may receive information about a network corresponding to the identification information of the terminal and an exit indicator, and when the received information about the network corresponds to a network to which the terminal is connecting, may release a network connection.

Figure 15:
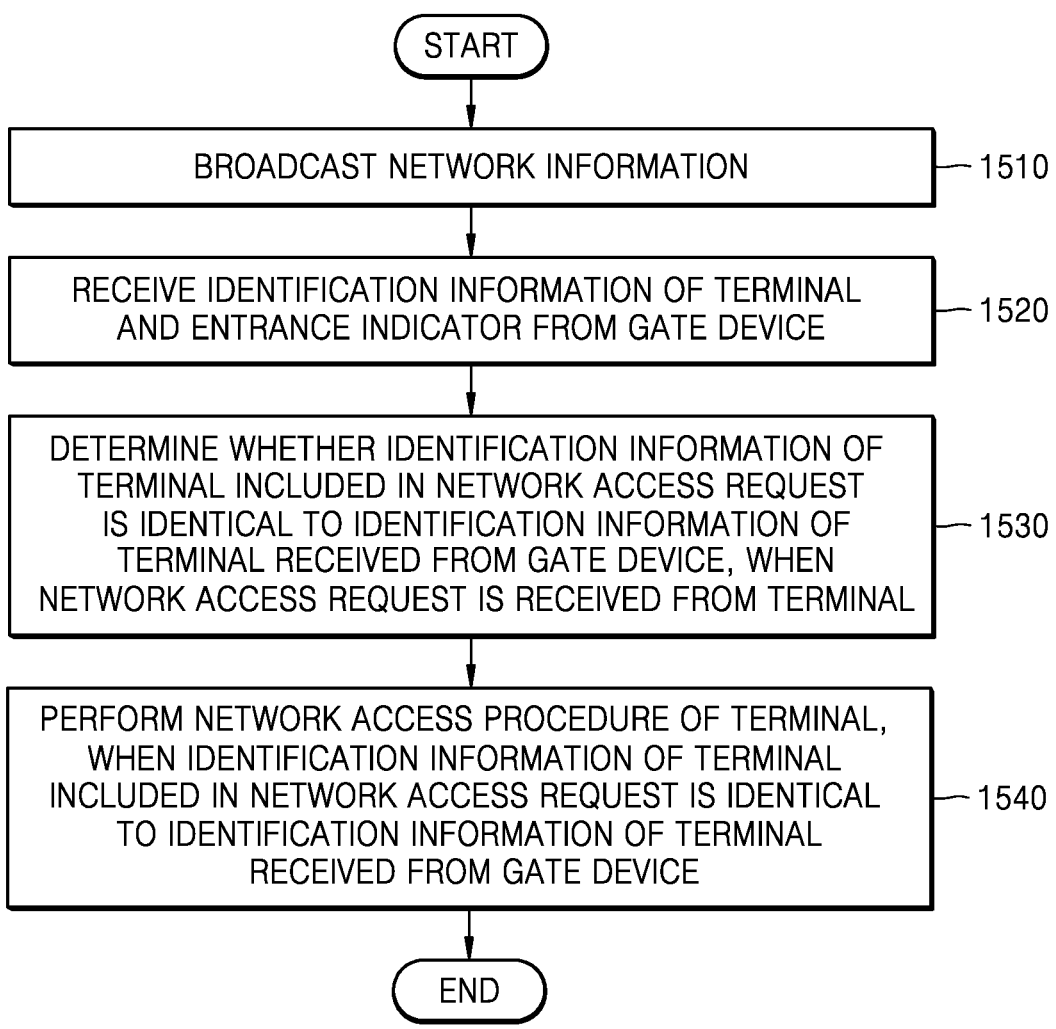
FIG. 15 is a flowchart of a network connection method of a base station according to an embodiment of the disclosure.

FIG. 15 is a flowchart of a network connection method of a base station according to an embodiment of the disclosure.

Referring to FIG. 15, in operation 1510, a base station may broadcast network information. In an embodiment of the disclosure, the base station may broadcast network identification information periodically or non-periodically. The base station may notify the presence of a network by broadcasting the network identification information, and may support access of a terminal to the base station.

In operation 1520, the base station may receive identification information of the terminal and an entrance indicator from a gate device. In an embodiment of the disclosure, because the terminal performs short-range communication with the gate device, the base station may determine that the terminal 10 passes through the gate device and enters a private area by receiving the identification information of the terminal and the entrance indicator from the gate device.

In operation 1530, when the base station receives a network access request from the terminal, the base station may determine whether the identification information of a terminal included in the network access request and the identification information of the terminal received from the gate device are identical to each other.

In operation 1540, when the identification information of the terminal included in the network access request and the identification information of the terminal received from the gate device are identical to each other, the base station may perform a network access procedure of the terminal.

In an embodiment of the disclosure, the base station may receive the identification information of the terminal and an exit indicator from the gate device, and may release a network connection. In this case, when the base station receives the identification information of the terminal and the exit indicator, the base station may start a timer. When the base station receives a network deregistration request from the terminal or the timer ends, the base station may release the network connection.

Figure 16:
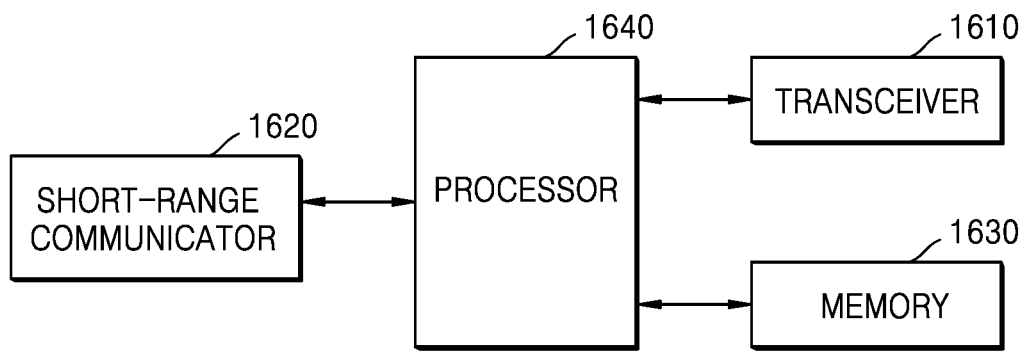
FIG. 16 is a block diagram illustrating a configuration of a terminal that performs a network connection according to an embodiment of the disclosure.

FIG. 16 is a block diagram illustrating a configuration of a terminal that performs a network connection according to an embodiment of the disclosure.

Referring to FIG. 16, a terminal according to an embodiment of the disclosure may include a transceiver 1610, a short-range communicator 1620, a memory 1630, and a processor 1640. However, elements of the terminal are not limited thereto. The terminal may include more or fewer elements than those illustrated in FIG. 16. For example, the terminal may include the transceiver 1610, the memory 1630, and the processor 1640, or may further include an inputter and a display in addition to the transceiver 1610, the short-range communicator 1620, the memory 1630, and the processor 1640. Also, the transceiver 1610, the memory 1630, and the processor 1640 may be implemented as one chip.

The transceiver 1610 may transmit/receive a signal to/from an external device. The signal transmitted/received to/from the external device may include control information and data. In this case, the external device may include a 5G base station, an edge server, a management server, an interworking server, etc. The transceiver 1610 may include an RF transmitter that up-converts and amplifies a frequency of a transmitted signal, and an RF receiver that performs low-noise amplification on a received signal and down-converts a frequency. However, this is an example of the transceiver 1610, and elements of the transceiver 160 are not limited to the RF transmitter and the RF receiver. Also, the transceiver 1610 may receive a signal through a wireless channel, may output the signal to the processor 1640, and may transmit a signal output from the processor 1640 through the wireless channel.

The short-range communicator 1620 is an element that supports short-range communication of the terminal. In an embodiment of the disclosure, examples of the short-range communication may include NFC and RFID. The short-range communicator 1620 may include a communication module according to a communication method. For example, the short-range communicator 1620 may include an NFC module or an RFID module. Also, the short-range communicator 1620 may receive a signal through a short-range communication channel, may output the signal to the processor 1640, and may transmit a signal output from the processor 1640 through the short-range communication channel.

The memory 1630 may store a program and data necessary to operate the terminal. In an embodiment of the disclosure, the memory 1630 may store control information or data included in a signal transmitted/received to/from the terminal. The memory 1630 may include a storage medium such as a read-only memory (ROM), a random-access memory (RAM), a hard disc, a compact disc-ROM (CD-ROM), or a digital versatile disk (DVD), or a combination of storage media. Also, a plurality of the memories 1630 may be provided. According to an embodiment of the disclosure, the memory 1630 may store a program for performing an operation for a network connection according to the above embodiments of the disclosure.

The processor 1640 may control a series of processes to operate the terminal according to an embodiment of the disclosure. For example, the processor 1640 may control elements of the terminal so that the terminal performs an operation. A plurality of the processors 1640 may be provided, and the processor 1640 may enable the terminal to perform an operation by executing the program stored in the memory 1630.

In an embodiment of the disclosure, the processor 1640 may control information about at least one network to be accessed by the terminal to be obtained, information about a network slice allowed for the terminal from among network slices included in the at least one network to be obtained, and when a network corresponding to the information about the at least one network is detected, and the terminal to access the allowed network slice of the detected network based on the information about the allowed network slice.

In an embodiment of the disclosure, the processor 1640 may control identification information of the terminal to be transmitted to a gate device by using the short-range communicator 1620 and the information about the at least one network to be accessed by the terminal and an entrance indicator to be received from the gate device by using the short-range communicator 1620. Also, the processor 1640 may control the received information about the at least one network and the identification information of the terminal to be transmitted to a management server and the information about the network slice allowed for the terminal to be received from the management server. Furthermore, the processor 1640 may control the identification information of the terminal to be transmitted to the gate device by using the short-range communicator 1620, information about a network corresponding to the identification information of the terminal and an exit indicator to be received from the gate device, and when the received information about the network and a network to which the terminal is connecting correspond to each other, a network connection to be released.

In an embodiment of the disclosure, the processor 1640 may control position information and the identification information of the terminal to be transmitted to the management server and the information about the at least one network to be accessed by the terminal that is determined based on the position information of the terminal to be received from the management server. Also, the processor 1640 may control the terminal to access the allowed network slice of the detected network based on at least one of SST information or SD information.

Figure 17:
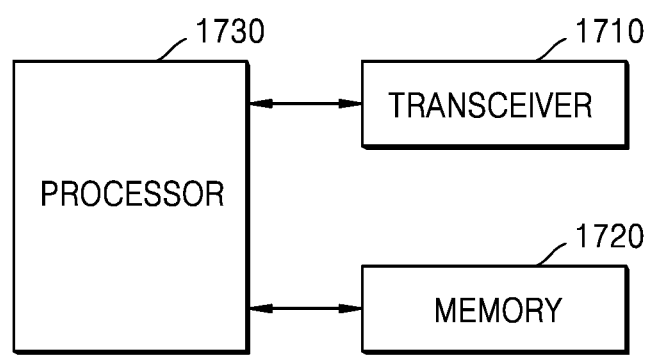
FIG. 17 is a block diagram illustrating a configuration of a base station that performs a network connection according to an embodiment of the disclosure.

FIG. 17 is a block diagram illustrating a configuration of a base station that performs a network connection according to an embodiment of the disclosure.

Referring to FIG. 17, a base station according to an embodiment of the disclosure may include a transceiver 1710, a memory 1720, and a processor 1730. However, elements of the base station are not limited thereto. For example, the base station may include more or fewer elements than those illustrated in FIG. 17. Also, the transceiver 1710, the memory 1720, and the processor 1730 may be implemented as one chip.

The transceiver 1710 may transmit/receive a signal to/from an external device. The signal transmitted/received to/from the external device may include control information and data. In this case, the external device may include a terminal, a management server, an edge server, an interworking server, etc. The transceiver 1710 may include an RF transmitter that up-converts and amplifies a frequency of a transmitted signal, and an RF receiver that performs low-noise amplification on a received signal and down-converts a frequency. However, this is an example of the transceiver 1710, and elements of the transceiver 1710 are not limited to the RF transmitter and the RF receiver. Also, the transceiver 1710 may receive a signal through a wireless channel, may output the signal to the processor 1730, and may transmit a signal output from the processor 1730 through the wireless channel.

The memory 1720 may store a program and data necessary to operate the base station. In an embodiment of the disclosure, the memory 1720 may store control information or data included in a signal transmitted/received to/from the base station. The memory 1720 may include a storage medium such as a ROM, a RAM, a hard disc, a CD-ROM, or a DVD, or a combination of storage media. Also, a plurality of the memories 1720 may be provided. According to an embodiment of the disclosure, the memory 1720 may store a program for performing an operation for a network connection according to the above embodiments of the disclosure.

The processor 1730 may control a series of processes to operate the base station according to an embodiment of the disclosure. For example, the processor 1730 may control elements of the base station so that the base station performs an operation according to an embodiment of the disclosure. A plurality of the processors 1730 may be provided, and the processor 1730 may enable the base station to perform an operation by executing the program stored in the memory 1720.

In an embodiment of the disclosure, the processor 1730 may control network information to be broadcast, identification information of the terminal and an entrance indicator to be received from a gate device, and when a network access request is received from the terminal, whether identification information of a terminal included in the network access request and the identification information of the terminal received from the gate device are identical to each other to be determined, and when the identification information of the terminal included in the network access request and the identification information of the terminal received from the gate device are identical to each other, a network access procedure of the terminal to be performed.

According to an embodiment of the disclosure, the processor 1730 may control the identification information of the terminal and an exit indicator to be received from the gate device and a network connection to be released. Also, when the identification information of the terminal and the exit indicator are received, the processor 1730 may control a timer to start. When a network deregistration request is received from the terminal or the timer ends, the processor 1730 may control the network connection to be released.

Although not shown, the gate device may include a transceiver, a short-range communicator, a memory, and a processor. The gate device may communicate with an external device through the transceiver, and may communicate with the terminal through the short-range communicator. Also, the memory may store a program for performing an operation for a network connection according to an embodiment of the disclosure. Furthermore, the processor may control a series of processes to operate the gate device according to an embodiment of the disclosure. For example, elements of the gate device may be controlled so that the gate device performs an operation according to an embodiment of the disclosure.

Methods according to claims or embodiments described herein may be implemented in hardware, software, or a combination of hardware and software.

When implemented in software, a computer-readable storage medium or a computer program product that stores one or more programs (software modules) may be provided. The one or more programs stored in the computer-readable storage medium or the computer program product are configured to be executed by one or more processors in an electronic device. The one or more programs include instructions that cause the electronic device to perform the methods according to claims or embodiments of the disclosure.

Such programs (software modules or software) may be stored in a RAM, a non-volatile memory including a flash memory, a ROM, an electrically erasable programmable ROM (EEPROM), a magnetic disc storage device, a CD-ROM, a DVD, another optical storage device, a magnetic cassette, or any combination thereof. In addition, each of such memories may be included as plural components.

In addition, the program may be stored in an attachable storage device that is accessible through a communication network such as the Internet, an Intranet, a local area network (LAN), a wide LAN (WLAN), or a storage area network (SAN), or any combination thereof. Such a storage device may access a device that performs an embodiment of the disclosure via an external port. Further, a separate storage device on a communication network may access a device that performs an embodiment of the disclosure.

In the above-discussed embodiments of the disclosure, elements included in the disclosure are expressed singular or plural in accordance with specific embodiments. However, it is to be understood that the singular or plural representations are selected appropriately for the sake of convenience of description, and the disclosure is not limited to the singular or plural constituent elements. Even expressed as a singular element, it may be composed of plural elements, and vice versa.

Accordingly, the true technical scope of the disclosure is defined by the technical spirit of the appended claims. Also, embodiments of the disclosure may be combined and operated according to needs. For example, parts of an embodiment and another embodiment of the disclosure may be combined. Also, other modifications based on the technical scope of the disclosure may be applied even to, for example, an LTE system, a 5G system, and an NR system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A network connection method of a terminal, the network connection method comprising:
    transmitting identification information of the terminal to a gate device by using short-range communication;
    receiving, from the gate device, information about a first network to be accessed by the terminal and an entrance indicator by using the short-range communication;
    obtaining, from a second network, information about a network slice allowed for the terminal from among network slices included in the first network;

detecting the first network based on the information about the first network;

accessing the network slice allowed for the terminal in the first network based on the information obtained from the second network about the network slice allowed for the terminal from among the network slices included in the first network;

receiving, in response to the transmitting of the identification information of the terminal to the gate device, information about the first network and an exit indicator from the gate device by using the short-range communication; and based on the information about the first network and the exit indicator, releasing a network connection to the first network.

2. The network connection method of claim 1, wherein the obtaining of the information about the network slice allowed for the terminal from among the network slices included in the first network further comprises:

transmitting, to a management server through the second network, the information about the first network and the identification information of the terminal; and receiving, from the management server through the second network, the information about the network slice allowed for the terminal.

3. The network connection method of claim 1, wherein the obtaining of the information about the network slice allowed for the terminal from among the network slices included in the first network comprises:

transmitting, to a management server through the second network, position information of the terminal and identification information of the terminal; and receiving, from the management server through the second network, the information about the network slice allowed for the terminal from among the network slices included in the first network that is determined based on the position information of the terminal.

4. The network connection method of claim 1, wherein the short-range communication comprises at least one of radio frequency identification (RFID) or near-field communication (NFC).

5. The network connection method of claim 1,
wherein the information about the network slice allowed for the terminal from among network slices included in the first network comprises at least one of slice service type (SST) information or slice differentiation (SD) information, and wherein the accessing of the network slice allowed for the terminal in the first network comprises accessing the network slice of the first network based on at least one of the SST information or the SD information.

6. A network connection method of a base station, the network connection method comprising:

receiving, by the base station on a first network from a gate device, identification information of a first terminal and an entrance indicator;

broadcasting, by a second network, information about a network slice allowed for the first terminal from among network slices included in the first network;

receiving, by the base station, a network access request from a requesting terminal, determining whether identification information of the requesting terminal included in the network access request and the identification information of the first terminal received from the gate device are identical to each other;

based on the identification information of the requesting terminal included in the network access request and the identification information of the first terminal received from the gate device being identical to each other, allowing the requesting terminal to access the network slice allowed for the first terminal from among the network slices included in the first network, receiving the identification information of the first terminal and an exit indicator from the gate device;

based on the identification information of the first terminal and the exit indicator being received, starting a timer; and based on one of a network deregistration request being received from the first terminal or on the timer ending, releasing the network connection.

7. A terminal for performing a network connection, the terminal comprising:

a short-range communicator;

at least one memory storing a program for the network connection; and at least one processor operatively coupled to the at least one memory and configured to:

transmit identification information of the terminal to a gate device by using the short-range communicator, receive, from the gate device by using the short-range communicator, the information about a first network to be accessed by the terminal and an entrance indicator from the gate device, obtain, from a second network, information about a network slice allowed for the terminal from among network slices included in the first network, detect the first network based on the information about the first network, access the network slice allowed for the terminal in the first network based on the information obtained from the second network about the network slice allowed for the terminal from among network slices included in the first network;

receive, in response to the transmitting of the identification information of the terminal to the gate device, information about the first network and an exit indicator from the gate device by using the short-range communication, and based on the information about the first network and the exit indicator, release a network connection to the first network.

8. The terminal of claim 7, wherein the at least one processor is further configured to:

transmit, to a management server through the second network, the information about the first network and the identification information of the terminal, and receive, from the management server through the second network, the information about the network slice allowed for the terminal.

9. The terminal of claim 7, wherein the at least one processor is further configured to:

transmit, to a management server through the second network, position information of the terminal and identification information of the terminal, and receive, from the management server through the second network, the information about the network slice allowed for the terminal from among the network slices included in the first network that is determined based on the position information of the terminal.

10. The terminal of claim 7, wherein the short-range communicator comprises at least one of a radio frequency identification (RFID) interface or a near-field communication (NFC) interface.

11. The terminal of claim 7,
wherein the information about the network slice allowed for the terminal from among network slices included in the first network comprises at least one of slice service type (SST) information or slice differentiation (SD) information, and
wherein the at least one processor is further configured to control the terminal to access the network slice allowed for the terminal in the first network based on at least one of the SST information or the SD information.

12. The terminal of claim 11, wherein network resources for a service according to the network slice allowed for the terminal are allocated based on a value of the SST included in the SST information.

13. The terminal of claim 12, wherein the value included in the SST information corresponds to at least one of enhanced mobile broadband (eMBB), ultra-reliable low latency communication (URLLC), mobile internet of things (MIoT), or a private network.

14. The terminal of claim 13, wherein the at least one of the eMBB, the URLLC, the MIoT or the private network correspond to network slices each forming a mutually exclusive end-to-end logical network.

\* \* \* \* \*